(12) United States Patent
Harada

(10) Patent No.: US 8,738,378 B2
(45) Date of Patent: May 27, 2014

(54) SPEECH RECOGNIZER, SPEECH RECOGNITION METHOD, AND SPEECH RECOGNITION PROGRAM

(75) Inventor: Shouji Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 260 days.

(21) Appl. No.: 12/634,208

(22) Filed: Dec. 9, 2009

(65) Prior Publication Data

US 2010/0088098 A1 Apr. 8, 2010

Related U.S. Application Data

(63) Continuation of application No. PCT/JP2007/063688, filed on Jul. 9, 2007.

(51) Int. Cl.
*G10L 15/08* (2006.01)
*G10L 15/14* (2006.01)

(52) U.S. Cl.
USPC ........................... 704/254; 704/251; 704/255

(58) Field of Classification Search
CPC ....... G10L 15/10; G10L 15/14; G10L 15/187; G10L 2015/025
USPC .......................................... 704/251, 254, 255
See application file for complete search history.

(56) References Cited

U.S. PATENT DOCUMENTS

| | | | | |
|---|---|---|---|---|
| 5,737,723 A | * | 4/1998 | Riley et al. | 704/243 |
| 6,018,736 A | * | 1/2000 | Gilai et al. | 1/1 |
| 6,064,959 A | * | 5/2000 | Young et al. | 704/251 |
| 6,185,530 B1 | * | 2/2001 | Ittycheriah et al. | 704/255 |
| 6,321,195 B1 | * | 11/2001 | Lee et al. | 704/241 |
| 6,324,513 B1 | * | 11/2001 | Nagai et al. | 704/275 |
| 6,400,805 B1 | * | 6/2002 | Brown et al. | 379/88.01 |
| 6,434,521 B1 | * | 8/2002 | Barnard | 704/244 |
| 6,859,774 B2 | * | 2/2005 | Mangu et al. | 704/255 |

(Continued)

FOREIGN PATENT DOCUMENTS

| | | |
|---|---|---|
| JP | A 62-116999 | 5/1987 |
| JP | A 63-5395 | 1/1988 |

(Continued)

OTHER PUBLICATIONS

Yuya Akita, et al., "Generalized Statistical Modeling of Pronunciation Variations for Spontaneous Speech Recognition," The transactions of the Institute of Electronics, Information and Communication Engineers D-II, vol. J88-D-II, No. 9, pp. 1780-1789, 2005.

*Primary Examiner* — James Wozniak
(74) *Attorney, Agent, or Firm* — Greer Burns & Crain Ltd.

(57) ABSTRACT

A speech recognition apparatus includes a speech collating unit that calculates similarities at each time between a feature amount converted by a speech analyzing unit and a word model generated by a word model generating unit. The speech collating unit extracts a word model from word models generated by the word model generating unit, whose minimum similarity among similarities at each time or whose overall similarity obtained from similarities at each time satisfies a second threshold value condition, and whose similarity at each time in a section among vocalization sections of utterance speech and corresponding to either a phoneme or a phoneme string associated with a first threshold value condition satisfies the first threshold value condition, and outputs as a recognition result the recognized word corresponding to the extracted word model.

7 Claims, 19 Drawing Sheets

(56) References Cited

U.S. PATENT DOCUMENTS

| | | | |
|---|---|---|---|
| 6,985,861 B2* | 1/2006 | Van Thong et al. | 704/254 |
| 7,013,276 B2* | 3/2006 | Bickley et al. | 704/255 |
| 2003/0069729 A1* | 4/2003 | Bickley et al. | 704/236 |
| 2005/0182558 A1 | 8/2005 | Maruta | |
| 2006/0136205 A1* | 6/2006 | Song | 704/243 |
| 2006/0200347 A1* | 9/2006 | Kim et al. | 704/236 |
| 2007/0016399 A1* | 1/2007 | Gao et al. | 704/5 |
| 2007/0174055 A1* | 7/2007 | Chengalvarayan et al. | 704/251 |
| 2008/0126100 A1* | 5/2008 | Grost et al. | 704/275 |
| 2008/0294441 A1* | 11/2008 | Saffer | 704/255 |

FOREIGN PATENT DOCUMENTS

| | | |
|---|---|---|
| JP | A 63-253997 | 10/1988 |
| JP | A 1-302295 | 12/1989 |
| JP | A 5-73087 | 3/1993 |
| JP | A 8-248979 | 9/1996 |
| JP | A 2003-140683 | 5/2003 |
| WO | WO 03/088209 A1 | 10/2003 |

* cited by examiner

| Pronunciation of recognized word |
|---|
| oda |
| toyotomi |
| tokugawa |
| ... |

FIG. 2

| Conversion rule | First threshold value condition |
|---|---|
| 'o' ⇔ /o/ | — |
| 'da' ⇔ /d//a/ | — |
| 'to' ⇔ /t//o/ | — |
| 'yo' ⇔ /y//o/ | — |
| 'mi' ⇔ /m//i/ | — |
| 'toyo' ⇔ /t//o//o/ | 70 |
| ... | ... |

FIG. 3

| Conversion rule | First threshold value condition |
|---|---|
| 'o' ⇔ /o/ | — |
| 'da' ⇔ /d//a/ | — |
| 'to' ⇔ /t//o/ | — |
| 'yo' ⇔ /y//o/ | — |
| 'mi' ⇔ /m//i/ | — |
| 'toyo' ⇔ /t//o//o/ | /t/:50 /o/:50 /o/:70 |
| ... | ... |

FIG. 4

| Standard pattern of phoneme |
|---|
| Standard pattern of phoneme /o/ |
| Standard pattern of phoneme /d/ |
| Standard pattern of phoneme /a/ |
| Standard pattern of phoneme /t/ |
| Standard pattern of phoneme /y/ |
| ... |

| Conversion rule | First threshold value condition |
|---|---|
| 'o' ⇔ /o/ | — |
| 'da' ⇔ /d//a/ | — |
| 'to' ⇔ /t//o/ | — |
| 'yo' ⇔ /y//o/ | — |
| 'mi' ⇔ /m//i/ | — |

FIG. 10B

| Conversion rule | First threshold value condition |
|---|---|
| 'toyo' ⇔ /t//o//o/ | 70 |

FIG. 10C

| Conversion rule | First threshold value condition |
|---|---|
| 'toyo' ⇔ /t//y//o/ | 80 |
| 'toyo' ⇔ /t//u//o/ | 80 |

| Conversion rule | First threshold value condition | Use-frequency calculating unit |
|---|---|---|
| 'o' ⇔ /o/ | — | 8 |
| 'da' ⇔ /d//a/ | — | 7 |
| 'to' ⇔ /t//o/ | — | 5 |
| 'yo' ⇔ /y//o/ | — | 8 |
| 'mi' ⇔ /m//i/ | — | 7 |
| 'toyo' ⇔ /t//o//o/ | 70 | 11 |
| ... | ... | ... |

FIG. 12

| Conversion rule | First threshold value condition | Use-frequency calculating unit |
|---|---|---|
| 'o' ⇔ /o/ | — | 8 |
| 'da' ⇔ /d//a/ | — | 7 |
| 'to' ⇔ /t//o/ | — | 5 |
| 'yo' ⇔ /y//o/ | — | 8 |
| 'mi' ⇔ /m//i/ | — | 7 |
| 'toyo' ⇔ /t//o//o/ | 65 | 11 |
| ... | ... | ... |

FIG. 13

| Conversion rule | First threshold value condition | Use-frequency calculating unit |
|---|---|---|
| 'o' ⇔ /o/ | — | 8 |
| 'da' ⇔ /d//a/ | — | 7 |
| 'to' ⇔ /t//o/ | — | 5 |
| 'yo' ⇔ /y//o/ | — | 8 |
| 'mi' ⇔ /m//i/ | — | 7 |
| 'toyo' ⇔ /t//o//o/ | 75 | 11 |
| ... | ... | ... |

FIG. 14

| Conversion rule | First threshold value condition | Use-frequency calculating unit |
|---|---|---|
| 'o' ⇔ /o/ | — | 0 |
| 'da' ⇔ /d//a/ | — | 0 |
| 'to' ⇔ /t//o/ | — | 1 |
| 'yo' ⇔ /y//o/ | — | 2 |
| 'mi' ⇔ /m//i/ | — | 0 |
| 'toyo' ⇔ /t//o//o/ | 70 | 6 |
| ... | ... | ... |

FIG. 17

| Conversion rule | First threshold value condition | Use-frequency calculating unit |
|---|---|---|
| 'o' ⇔ /o/ | — | 0 |
| 'da' ⇔ /d//a/ | — | 0 |
| 'to' ⇔ /t//o/ | — | 1 |
| 'yo' ⇔ /y//o/ | — | 2 |
| 'mi' ⇔ /m//i/ | — | 0 |
| 'toyo' ⇔ /t//o//o/ | 75 | 6 |
| ... | ... | ... |

FIG. 18

| Conversion rule | First threshold value condition | Use-frequency calculating unit |
|---|---|---|
| 'o' ⇔ /o/ | — | 0 |
| 'da' ⇔ /d//a/ | — | 0 |
| 'to' ⇔ /t//o/ | — | 1 |
| 'yo' ⇔ /y//o/ | — | 2 |
| 'mi' ⇔ /m//i/ | — | 0 |
| 'toyo' ⇔ /t//o//o/ | 65 | 6 |
| ... | ... | ... |

FIG. 19

| Conversion rule | First threshold value condition | Duration |
|---|---|---|
| 'o' ⇔ /o/ | — | — |
| 'da' ⇔ /d//a/ | — | — |
| 'to' ⇔ /t//o/ | — | — |
| 'yo' ⇔ /y//o/ | — | — |
| 'mi' ⇔ /m//i/ | — | — |
| 'toyo' ⇔ /t//o//o/ | 70 | 150 |
| ... | ... | ... |

FIG. 22

SPEECH RECOGNIZER, SPEECH RECOGNITION METHOD, AND SPEECH RECOGNITION PROGRAM

CROSS-REFERENCE TO RELATED APPLICATION

This application is a continuation of PCT International Application No. PCT/JP2007/063688 which has an International filing date of Jul. 9, 2007, and designated the United States of America.

FIELD

The present invention relates to a speech recognition apparatus, a speech recognition method and a speech recognition program that recognizes a human utterance speech by converting a pronunciation of a recognized word into a phoneme string with reference to a conversion rule and by generating a word model as a standard pattern string on the basis of the thus converted phoneme string.

BACKGROUND

Typically, a speech recognition apparatus has a function of recognizing a human utterance speech both by converting a pronunciation of a recognized word stored in a recognized-word storing unit into a phoneme string and by generating a word model as a standard pattern string from the thus converted phoneme string. Specifically, the speech recognition apparatus converts a pronunciation of a recognized word into a phoneme string with reference to either a conversion rule between a pronunciation and a phoneme or a conversion rule between a pronunciation and a phoneme string. The speech recognition apparatus generates a word model as a standard pattern string from the converted phoneme string. The speech recognition apparatus calculates a similarity at each time between an inputted utterance speech and the generated word model. From the generated word models, the speech recognition apparatus extracts a word model whose similarity at each time is equal to or higher than a threshold value. The speech recognition apparatus outputs as a recognition result the recognized word that corresponds to the extracted word model (see for example, Japanese Laid-open Patent Publication No. 62-116999, Japanese Laid-open Patent Publication No. 63-5395, Japanese Laid-open Patent Publication No. 01-302295 or Japanese Laid-open Patent Publication No. 08-248979).

In the meantime, a human being does not always vocalize all phonemes clearly. That is, human utterance speech usually includes ambiguous phonemes. In particular, when a human being vocalizes fast, his/her utterance speech often may include ambiguous phonemes. For this reason, even when a human being vocalizes a recognized word, sometimes a speech recognition apparatus may not be able to recognize his/her vocalization.

By way of example, a pronunciation 'toyotomi of a recognized word has been stored in the recognized-word storing unit of the speech recognition apparatus. In this case, the speech recognition apparatus converts the pronunciation 'toyotomi of the recognized word into a phoneme string /toyotomi/ in accordance with a conversion rule. Here, according to the conversion rule, a Japanese character 'to' corresponds to /to/ (hereinafter, this rule is expressed as 'to'< >/to/), similarly, 'yo'< >/yo/ and 'mi'< >/mi/. The speech recognition apparatus generates a word model of "toyotomi" as a standard pattern string from the converted phoneme string /toyotomi/. Here, in a human vocalization of the recognized word 'toyotomi, since 'yo' in the 'toyotomi is vocalized ambiguously, the speech recognition apparatus determines that the 'yo'(phoneme /yo/) in 'toyotomi is 'o' (phoneme /o/) from which a phoneme /y/ is omitted, hence that the utterance speech is 'tootomi. When the similarity at each time between 'o' in the utterance speech 'tootomi and "yo" in a word model "toyotomi" is equal to or lower than a given threshold value, the speech recognition apparatus cannot recognize the utterance speech 'tootomi.

For solving such problems, in a typical speech recognition apparatus, a phoneme string including a phoneme that tends to be ambiguous due to the pronunciation of the recognized word has been added in advance to the conversion rule. In the above example, a rule of 'toyo'< >/too/ is added to the conversion rules including 'to'< >/to/, 'yo'< >/yo/ and 'mi< >/ml/. Thereby, the speech recognition apparatus converts the pronunciation of the recognized word 'toyotomi into a phoneme string /toyotomi/ and a phoneme string /tootomi/. The speech recognition apparatus generates a word model of "toyotomi" as a standard pattern string from the converted phoneme string /toyotomi/ and a word model of "tootomi" as a standard pattern string from the converted phoneme string /tootomi/. In this manner, even when the speech recognition apparatus determines that the utterance speech is 'tootomi, since the similarity at each time between the utterance speech 'tootomi and the word model "tootomi" is higher than the given threshold value, the utterance speech 'tootomi ' can be recognized as 'toyotomi.

SUMMARY

According to an aspect of the invention, a speech recognition apparatus includes: a speech analyzing unit that converts an inputted utterance speech into a feature amount, a recognized-word storing unit that stores a pronunciation of a recognized word, a conversion rule storing unit that stores a conversion rule between a pronunciation and a phoneme or a conversion rule between a pronunciation and a phoneme string, a phoneme string converting unit that converts the pronunciation of the recognized word stored in the recognized-word storing unit into a phoneme string in accordance with the conversion rule stored in the conversion rule storing unit, a phoneme model storing unit that stores a standard pattern obtained by modeling information about which phoneme tends to become what kind of feature amount, a word model generating unit that generates a word model as a standard pattern string by extracting standard patterns stored in the phoneme model storing unit on the basis of the phoneme string converted by the phoneme string converting unit and by linking the extracted standard patterns, and a speech collating unit that calculates similarities at each time between the feature amount converted by the speech analyzing unit and the word model generated by the word model generating unit. The conversion rule storing unit further stores a first threshold value condition associated with a phoneme or a phoneme string of at least one of the conversion rules, and the speech collating unit extracts a word model from the word models generated by the word model generating unit, whose minimum similarity among the similarities at each time or whose overall similarity obtained from similarities at each time satisfies a second threshold value condition, and whose similarity at each time in a section among vocalization sections of the utterance speech and corresponding to either a phoneme or a phoneme string associated with the first threshold value condition satisfies the first threshold value condition, and outputs the recognized word as a recognition result corresponding to the extracted word model.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of data contents in a recognized-word storing unit in the speech recognition apparatus.

FIG. 3 is a diagram illustrating an example of data contents in a conversion rule storing unit in the speech recognition apparatus.

FIG. 4 is a diagram illustrating another example of data contents in a conversion rule storing unit in the speech recognition apparatus.

FIG. 5 is a diagram illustrating an example of data contents in a phoneme model storing unit in the speech recognition apparatus.

FIGS. 10A-10C are diagrams each illustrating an example of data contents in a conversion rule storing unit in the speech recognition apparatus.

FIG. 12 is a diagram illustrating an example of data contents in a conversion rule storing unit in the speech recognition apparatus.

FIG. 13 is a diagram illustrating an example of data contents to be stored in the conversion rule storing unit, after being updated by a first threshold value condition updating unit in the speech recognition apparatus.

FIG. 14 is a diagram illustrating an example of data contents to be stored in the conversion rule storing unit, after being updated by the first threshold value condition updating unit in the speech recognition apparatus.

FIG. 17 is a diagram illustrating an example of data contents in a conversion rule storing unit in the speech recognition apparatus.

FIG. 18 is a diagram illustrating an example of data contents to be stored in the conversion rule storing unit, after being updated by a first threshold value condition updating unit in the speech recognition apparatus.

FIG. 19 is a diagram illustrating an example of data contents to be stored in the conversion rule storing unit, after being updated by the first threshold value condition updating unit in the speech recognition apparatus.

FIG. 22 is a diagram illustrating an example of data contents in a conversion rule storing unit in the speech recognition apparatus.

DESCRIPTION OF EMBODIMENTS

Figure 1:
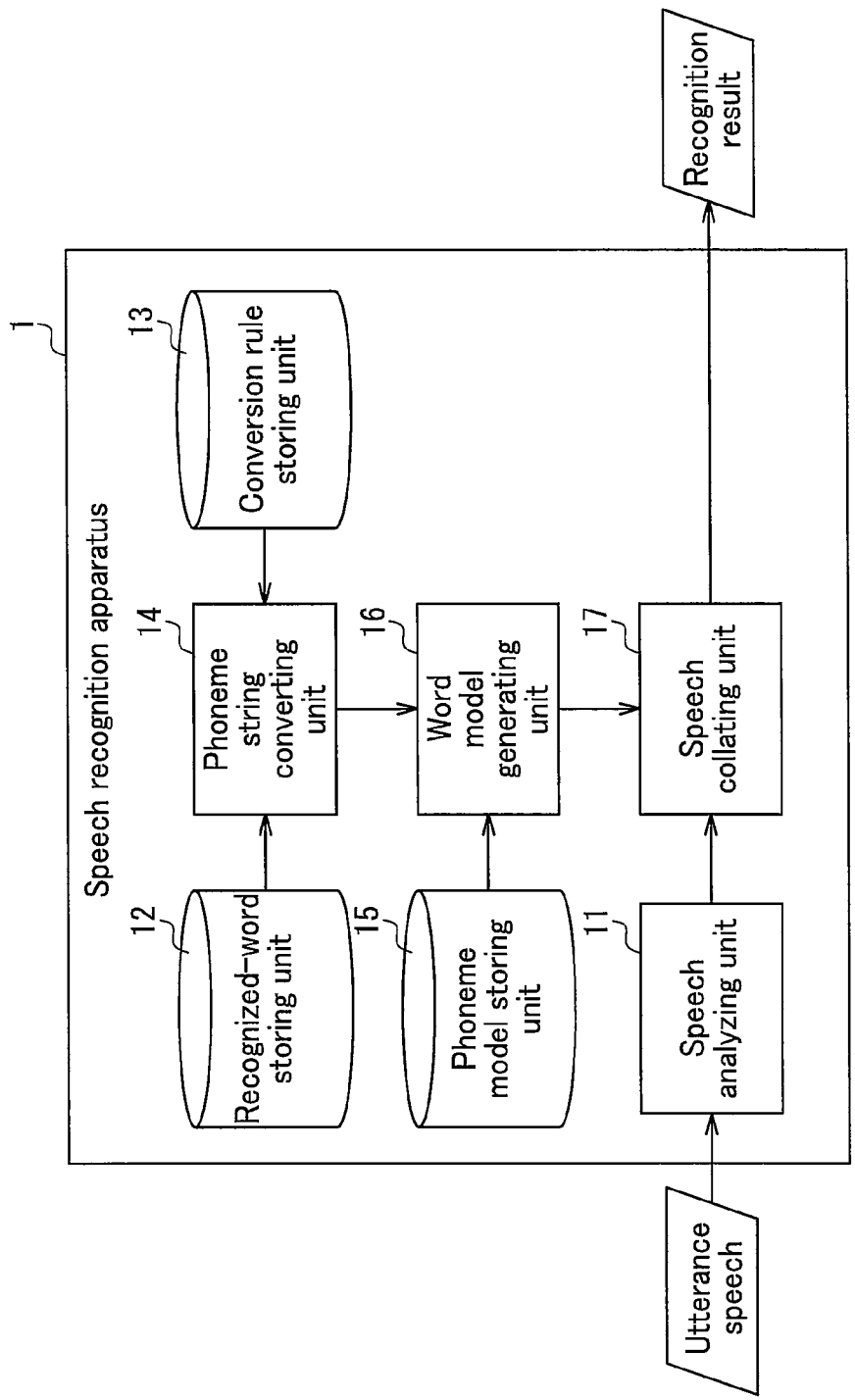
FIG. 1 is a block diagram illustrating a schematic configuration of a speech recognition apparatus according to a first embodiment of the present invention.

The above-described typical speech recognition apparatus is capable of recognizing an utterance speech including an ambiguous phoneme in a case where a human being vocalizes a recognized word. However, even when the human being vocalizes a word other than the recognized word, the speech recognition apparatus may misrecognize the vocalized word as a recognized word, since in the typical speech recognition apparatus, a phoneme string including a phoneme that tends to be ambiguous due to the pronunciation of the recognized word has been added in advance to the conversion rules.

Specifically, the typical speech recognition apparatus is capable of recognizing an utterance speech 'tootomi including an ambiguous phoneme in a case where a human being vocalizes a recognized word 'toyotomi . However, in the typical speech recognition apparatus, when a human being vocalizes a word 'tomotomi other than the recognized word 'toyotomi, the similarity at each time between the utterance speech 'tomotomi and the word model "tootomi" sometimes becomes equal to or higher than the given threshold value, and in such a case, the utterance speech 'tomotomi' will be misrecognized as 'toyotomi.

According to an aspect of the invention, a speech recognition apparatus includes: a speech analyzing unit that converts an inputted utterance speech into a feature amount, a recognized-word storing unit that stores a pronunciation of a recognized word, a conversion rule storing unit that stores a conversion rule between a pronunciation and a phoneme or a conversion rule between a pronunciation and a phoneme string, a phoneme string converting unit that converts the pronunciation of the recognized word stored in the recognized-word storing unit into a phoneme string in accordance with the conversion rule stored in the conversion rule storing unit, a phoneme model storing unit that stores a standard pattern obtained by modeling information about which phoneme tends to become what kind of feature amount, a word model generating unit that generates a word model as a standard pattern string by extracting standard patterns stored in the phoneme model storing unit on the basis of the phoneme string converted by the phoneme string converting unit and by linking the extracted standard patterns, and a speech collating unit that calculates similarities at each time between the feature amount converted by the speech analyzing unit and the word model generated by the word model generating unit. The conversion rule storing unit further stores a first threshold value condition associated with a phoneme or a phoneme string of at least one of the conversion rules, and the speech collating unit extracts a word model from the word models generated by the word model generating unit, whose minimum similarity among the similarities at each time or whose overall similarity obtained from similarities at each time satisfies a second threshold value condition, and whose similarity at each time in a section among vocalization sections of the utterance speech and corresponding to either a phoneme or a phoneme string associated with the first threshold value condition satisfies the first threshold value condition, and outputs the recognized word as a recognition result corresponding to the extracted word model.

The first threshold value condition is set for enabling recognition of an utterance speech including an ambiguous phoneme in a case where a human being vocalizes a recognized word, and further the first threshold value condition is set for enabling rejection of a word other than the recognized word in a case where a human being vocalizes the word other than the recognized word. Thereby, the speech recognition apparatus of the present invention recognizes an utterance speech including an ambiguous phoneme in a case where a human being vocalizes the recognized word, and at the same time, when the human being vocalizes a word other than the recognized word, the speech recognition apparatus can prevent misrecognition of the vocalized word as the recognized word. In this example, the speech collating unit calculates similarities at each time between a feature amount of an utterance speech including an ambiguous phoneme in a case where a human being vocalizes a recognized word and a generated word model. In this case, the speech collating unit extracts a word model from the generated word models, whose minimum similarity among the similarities at each time or whose overall similarity obtained from the similarities at each time satisfies a second threshold value condition and also whose similarity at each time in a section among vocalization sections of the utterance speech and corresponding to either a phoneme or a phoneme string associated with the first threshold value condition satisfies the first threshold value condition. Thereby, the speech collating unit can output as a recognition result a recognized word corresponding to the extracted word model. In a contrastive example, the speech collating unit has calculated a similarity at each time between the feature amount of the word other than the recognized word and the generated word model in a case where the human being vocalizes the word other than the recognized word. In this case, there is no word model whose similarity at each time in a section among vocalization sections of the utterance speech and corresponding to a phoneme or a phoneme string associated with the first threshold value condition satisfies the first threshold value condition. For this reason, the speech collating unit does not extract a word model. In this manner, when a human being vocalizes a word other than the recognized word, the speech collating unit can reject this word.

It is preferable in the speech recognition apparatus according to the present invention that a plurality of the conversion rule storing units are provided for every condition indicated by the first threshold value condition, and the phoneme string converting unit selects, from the plural conversion rule storing units, a conversion rule storing unit to be used for converting the pronunciation of the recognized word into a phoneme string on the basis of the number of the pronunciations of the recognized word stored in the recognized-word storing unit, and converts the pronunciation of the recognized word stored in the recognized-word storing unit into a phoneme string in accordance with the conversion rule stored in the selected conversion rule storing unit.

According to the above-mentioned configuration, the phoneme string converting unit selects, from a plurality of conversion rule storing units, a conversion rule storing unit to be used for converting the pronunciation of the recognized word into a phoneme string, on the basis of the number of pronunciations of the recognized word. For example, when the number of the pronunciations of the recognized word is as large as 1000 or more, the phoneme string converting unit selects only the conversion rule storing unit that stores a lower first threshold value condition because the conversion rule storing unit storing the lower first threshold value condition typically stores a conversion rule of a phoneme string including a phoneme that tends to be ambiguous in a case where a human being vocalizes the recognized word. A conversion rule storing unit that stores a higher first threshold value condition stores typically a conversion rule of a phoneme string including a phoneme that seldom becomes ambiguous in a case where a human being vocalizes the recognized word. In contrast for example, if the number of pronunciations of the recognized word is as small as less than 1000, the phoneme string converting unit selects all of the conversion rule storing units. The phoneme string converting unit converts the pronunciation of the recognized word into a phoneme string in accordance with the conversion rule stored in the selected conversion rule storing units. Thereby, for example, when the number of pronunciations of the recognized word is large, the phoneme string converting unit can convert the pronunciation of the recognized word into a phoneme string by using the minimum numbers of conversion rule storing units. And thus, degradation in the speed in collation by the speech collating unit can be suppressed. On the other hand, for example, when the number of the pronunciations of the recognized word is small, the phoneme string converting unit can convert the pronunciation of the recognized word into a phoneme string by using all of the conversion rule storing units. Therefore, the speech collating unit can recognize reliably an utterance speech including an ambiguous phoneme in a case where a human being vocalizes the recognized word.

In the above-mentioned speech recognition apparatus according to the present invention, it is preferable that it further includes a use-frequency calculating unit that calculates a use-frequency of the conversion rule used for generating a word model corresponding to the recognized word as the recognition result outputted by the speech collating unit, and a first threshold value condition updating unit that, when a use-frequency of the conversion rule calculated by the use-frequency calculating unit is higher than a boundary condition, updates a first threshold value condition associated with the phoneme or the phoneme string of the conversion rule so that the first threshold value condition is lowered, and when the use-frequency of the conversion rule calculated by the use-frequency calculating unit is lower than the boundary condition, updates the first threshold value condition associated with the phoneme or the phoneme string of the conversion rule so that the first threshold value condition is raised.

According to the above-mentioned configuration, the use-frequency calculating unit calculates the use-frequency of the conversion rule used for generating the word model corresponding to the recognized word as the recognition result. When the use-frequency of the conversion rule is higher than the boundary condition, the first threshold value condition updating unit updates the first threshold value condition associated with the phoneme or the phoneme string of the conversion rule so that the first threshold value condition is lowered. Namely, if the use-frequency of the conversion rule is high, this conversion rule is used frequently to generate a word model, and thus the first threshold value condition updating unit can update the first threshold value condition so as to lower the first threshold value condition. Thereby, the recognition rate of the speech recognition apparatus is improved. On the other hand, when the use-frequency of the conversion rule is lower than the boundary condition, the first threshold value condition updating unit updates the first threshold value condition associated with the phoneme or the phoneme string of the conversion rule, so that the first threshold value condition is raised. Namely, when the use-frequency of the conversion rule is low, this conversion rule is not used frequently to generate a word model, and thus, the first threshold value condition updating unit can update the first threshold value condition so as to raise the first threshold value condition. Thereby, the recognition rate of the speech recognition apparatus is lowered.

In the speech recognition apparatus of the present invention, it is preferable that it further includes: an inputting unit that accepts a decision from a user whether the recognition result outputted by the speech collating unit is incorrect or not, a use-frequency calculating unit that, when the inputting unit accepts from the user a decision that the recognition result outputted by the speech collating unit is incorrect, calculates a use-frequency of the conversion rule used for generating the word model corresponding to the recognized word as the recognition result, and a first threshold value condition updating unit that, when a use-frequency of the conversion rule calculated by the use-frequency calculating unit is higher than the boundary condition, updates a first threshold value condition associated with the phoneme or the phoneme string of the conversion rule so that the first threshold value condition is raised, and when the use-frequency of the conversion rule calculated by the use-frequency calculating unit is lower than the boundary condition, updates the first threshold value condition associated with the phoneme or the phoneme string of the conversion rule so that the first threshold value condition is lowered.

According to the above-mentioned configuration, the inputting unit accepts from the user a decision whether the recognition result outputted by the speech collating unit is incorrect or not. When the inputting unit accepts from the user a decision that the recognition result outputted by the speech collating unit is incorrect, the use-frequency calculating unit calculates the use-frequency of the conversion rule used for generating the word model corresponding to the recognized word of this recognition result. When the use-frequency of the conversion rule is higher than the boundary condition, the first threshold value condition updating unit updates this first threshold value condition associated with the phoneme or the phoneme string of this conversion rule so that the first threshold value condition is raised. Namely, when the use-frequency of the conversion rule is high, this conversion rule is used frequently to generate a word model in a case where the recognized word is incorrect, and thus the first threshold value condition updating unit can update the first threshold value condition so that the first threshold value condition is raised. Thereby, the recognition rate of the speech recognition apparatus is lowered. On the other hand, when the use-frequency of the conversion rule is lower than the boundary condition, the first threshold value condition updating unit updates the first threshold value condition associated with the phoneme or the phoneme string of this conversion rule so that the first threshold value condition is lowered. Namely, when the use-frequency of the conversion rule is low, this conversion rule is not used frequently to generate a word model in a case where the recognized word is incorrect, and thus the first threshold value condition updating unit can update the first threshold value condition so as to lower the first threshold value condition. Thereby, the recognition rate of the speech recognition apparatus is improved.

In the speech recognition apparatus according to the present invention, it is preferable that the conversion rule storing unit further stores a duration associated with the phoneme or the phoneme string of the conversion rule, and the speech collating unit determines whether a vocalization period in a section among vocalization sections of the utterance speech and corresponding to either the phoneme or the phoneme string associated with the duration is at least equal to the duration or not; when determining that the vocalization period in the section is equal to or higher than the duration, the speech collating unit rejects the extracted word model, and when determining that the vocalization period in the section is shorter than the duration, the speech collating unit outputs as the recognition result the recognized word corresponding to the extracted word model.

According to the above-mentioned configuration, when determining that a vocalization period in a section among vocalization sections of utterance speech and corresponding to either a phoneme or a phoneme string associated with a duration is equal to or longer than the duration, the speech collating unit rejects the extracted word model. Namely, when the vocalization period in the section is equal to or longer than the duration, it indicates that a human being vocalizes slowly, and thus even if a word model has been extracted, the speech collating unit rejects the extracted word model. Thereby, it is possible to prevent misrecognition by the speech recognition apparatus. When determining a vocalization period in a section among vocalization sections of utterance speech and corresponding to either a phoneme or a phoneme string associated with duration is shorter than the duration, the speech collating unit outputs as a recognition result the recognized word corresponding to the extracted word model. Namely, when the vocalization period in the section is shorter than the duration, it indicates that a human being vocalizes fast, and thus the speech collating unit outputs the extracted word model as the recognition result. Thereby, the speech collating unit can recognize an utterance speech including an ambiguous phoneme in a case where a human being vocalizes the recognized word.

For achieving the above-mentioned object, a speech recognition method according to the present invention includes: a speech analysis in which a speech analyzing unit provided in a computer converts an inputted utterance speech into a feature amount, a phoneme string conversion in which a phoneme string converting unit provided in the computer converts a pronunciation of a recognized word stored in a recognized-word storing unit that stores pronunciations of recognized words into a phoneme string, in accordance with a conversion rule stored in a conversion rule storing unit that stores either a conversion rule between a pronunciation and a phoneme or a conversion rule between a pronunciation and a phoneme string, a word model generation in which a word model generating unit provided in the computer generates a word model as a standard pattern string, by extracting standard patterns stored in a phoneme model storing unit that stores standard patterns obtained by modeling information about which phoneme tends to become what kind of feature amount, on the basis of the phoneme string converted due to the phoneme string conversion, and by linking the extracted standard patterns, and a speech collation in which a speech collating unit provided in the computer calculates similarities at each time between the feature amount converted due to the speech analysis and the word model generated due to the word model generation; the conversion rule storing unit further stores a first threshold value condition associated with a phoneme or a phoneme string of at least one of the conversion rules, and the speech collation includes: extracting a word model from the word models generated due to the word model generation, whose minimum similarity among the similarities at each time or whose overall similarity obtained from similarities at each time satisfies a second threshold value condition, and whose similarity at each time in a section among vocalization sections of the utterance speech and corresponding to either a phoneme or a phoneme string associated with the first threshold value condition satisfies the first threshold value condition; and outputting as a recognition result the recognized word corresponding to the extracted word model.

For achieving the above-mentioned object, a speech recognition program according to the present invention causes a computer to execute: a speech analysis of converting an inputted utterance speech into a feature amount, a phoneme string conversion of converting a pronunciation of a recognized word stored in a recognized-word storing unit that stores recognized words into a phoneme string in accordance with a conversion rule stored in a conversion rule storing unit that stores either a conversion rule between a pronunciation and a phoneme or a conversion rule between a pronunciation and a phoneme string, a word model generation of generating a word model as a standard pattern string, by extracting a standard pattern stored in a phoneme model storing unit that stores standard patterns obtained by modeling information about which phoneme tends to become what kind of feature amount, on the basis of the phoneme string converted due to the phoneme string conversion, and by linking the extracted standard patterns, and a speech collation of calculating similarities at each time between the feature amount converted due to the speech analysis and the word model generated due to the word model generation; the conversion rule storing unit further stores a first threshold value condition associated with a phoneme or a phoneme string of at least one of the conversion rules, and in the speech collation, the computer is caused to execute: extracting a word model from the word models generated due to the word model generation, whose minimum similarity among the similarities at each time or whose overall similarity obtained from similarities at each time satisfies a second threshold value condition, and whose similarity at each time in a section among vocalization sections of the utterance speech and corresponding to either a phoneme or a phoneme string associated with a first threshold value condition satisfies the first threshold value condition; and outputting as a recognition result the recognized word corresponding to the extracted word model.

The speech recognition method and the speech recognition program according to the present invention provide the effects similar to those of the above-mentioned speech recognition apparatus.

As mentioned above, the speech recognition apparatus, the speech recognition method and the speech recognition program of the present invention provide an effect that, an ambiguous utterance speech is recognized in a case where a human being vocalizes a recognized word, and that when the human being vocalizes a word other than the recognized word, misrecognition of the vocalized word as a recognized word can be prevented.

Hereinafter, the present invention will be described more specifically with reference to the attached drawings.

First Embodiment

FIG. 1 is a block diagram illustrating a schematic configuration of a speech recognition apparatus 1 according to the present embodiment. The speech recognition apparatus 1 as illustrated in FIG. 1 is used, for example, as a speech recognition engine that receives an utterance speech of a user from a host program such as a speech interactive application and returns the recognition result to the host program. The speech recognition apparatus 1 is formed of, for example, a general-purpose computer such as a personal computer, a server machine or the like. Alternatively, the speech recognition apparatus 1 can be formed of a computer assembled in electronic equipment such as an on-board information terminal, a mobile phone, and a household electric appliance.

Namely, the speech recognition apparatus 1 according to the present embodiment includes a speech analyzing unit 11, a recognized-word storing unit 12, a conversion rule storing unit 13, phoneme string converting unit 14, a phoneme model storing unit 15, a word model generating unit 16 and a speech collating unit 17.

The speech analyzing unit 11 converts an inputted utterance speech into a feature amount for every frame. MFCC, LPC Cepstrum, a power, a primary or secondary regression coefficient thereof as well as multidimensional vectors such as results of dimensional compression of these values by a principal component analysis and a discriminant analysis are used for the feature amounts in many cases, though there is no particular limitation. The converted feature amounts are stored in an internal memory together with information intrinsic to each frame (frame intrinsic information). The frame intrinsic information is data representing, for example, a frame number indicating how manieth frame from the top each frame is, a beginning time and an ending time of each frame, a power and the like.

The recognized-word storing unit 12 stores pronunciations of plural recognized words. FIG. 2 is a diagram illustrating an example of data contents to be stored in the recognized-word storing unit 12. As illustrated in FIG. 2, pronunciations of recognized words are stored in the recognized-word storing unit 12. For example, the user of the speech recognition apparatus 1 makes the speech recognition apparatus 1 read out the data on a recording medium that stores the pronunciation data of words, thereby the pronunciations of the recognized words are stored in the recognized-word storing unit 12.

The conversion rule storing unit 13 stores at least either the conversion rule between a pronunciation and a phoneme or the conversion rule between a pronunciation and a phoneme string. Furthermore, the conversion rule storing unit 13 stores a first threshold value condition associated with either a phoneme or a phoneme string of at least one of the conversion rules. FIG. 3 is a diagram illustrating an example of data contents to be stored in the conversion rule storing unit 13. As illustrated in FIG. 3, a conversion rule and a first threshold value condition are stored in the conversion rule storing unit 13. In the example as illustrated in FIG. 3, in the conversion rule storing unit 13, a first threshold value condition "70" is stored in correspondence with a phoneme string /t/ /o/ /o/ of a conversion rule 'toyo'< >/t/ /o/ /o/. Further, in the conversion rule storing unit 13, a first threshold value condition "NONE" ("–" in FIG. 3) is stored in correspondence with a phoneme or a phoneme string other than the conversion rule 'toyo'< >/t/ /o/ /o/. Namely, the first threshold value condition is not set for a phoneme or a phoneme string other than the conversion rule 'toyo'< >/t/ /o/ /o/. Here, the first threshold value condition denotes a condition for the speech collating unit 17 to output the recognized word as a recognition result.

In the present embodiment, the conversion rule and the first threshold value condition stored in the conversion rule storing unit 13 are set in advance by an administrator of the speech recognition apparatus 1 (for example, one of the staff of the manufacturer that manufactures the speech recognition apparatus 1). In the present embodiment, the administrator of the speech recognition apparatus 1 sets the first threshold value condition for the conversion rule storing unit 13 on the basis of their experience. Alternatively for example, the first threshold value condition can be set for the conversion rule storing unit 13 on the basis of the precision in collating the phonemes. Specifically, the administrator of the speech recognition apparatus 1 investigates in advance the phoneme collation precision for each phoneme. It should be noted that the phoneme collation precision denotes a level that the phoneme can be recognized correctly by the speech recognition apparatus 1, and it forms statistical data. For example, since a phoneme /m/ and a phoneme /n/ resemble to each other in a human pronunciation, the speech recognition apparatus 1 tends to misrecognize the phoneme /m/ as the phoneme /n/, and the phoneme /n/ as the phoneme /m/. Therefore, in general, the collation precision between the phoneme /m/ and the phoneme /n/ is low. In contrast, since a phoneme /a/ is a phoneme which a human being can pronounce clearly, the risk that the phoneme /a/ is misrecognized by the speech recognition apparatus 1 is low. Therefore, in general, the collation precision of the phoneme /a/ is high.

The administrator of the speech recognition apparatus 1 calculates the average value of the collation precision for each phoneme in the phoneme string of the conversion rule for which the first threshold value condition is to be set. For example, when the conversion rule for which the first threshold value condition is to be set is 'toyo'< >/t/ /o/ /o/, the administrator of the speech recognition apparatus 1 calculates the average value in the collation precision for each phoneme in the phoneme string /t/ /o/ /o/ on the basis of the collation precision of the phoneme /t/ and the collation precision of the phoneme /o/. The administrator of the speech recognition apparatus 1 decides the first threshold value condition to be set, on the basis of the average value of the thus calculated collation precision. For example, when the average value of the collation precision is large, the administrator of the speech recognition apparatus 1 sets a first threshold value condition with a low threshold value for the conversion rule storing unit 13. When the average value of the collation precision is small, the administrator of the speech recognition apparatus 1 sets a first threshold value condition with a high threshold value for the conversion rule storing unit 13.

Though FIG. 3 illustrates an example where the first threshold value condition "70" is stored in the conversion rule storing unit 13 in correspondence with the phoneme string /t/ /o/ /o/ of the conversion rule 'toyo'< >/t/ /o/ /o/, the present invention is not limited to this example. Alternatively for example, as illustrated in FIG. 4, first threshold value conditions can be stored respectively in the conversion rule storing unit 13 in correspondence with the respective phonemes in the phoneme string /t/ /o/ /o/ of the conversion rule 'toyo'< >/t/ /o/ /o/. In the example as illustrated in FIG. 4, a first threshold value condition "50" is stored in the conversion rule storing unit 13 in correspondence with the first phoneme /t/ in the phoneme string /t/ /o/ /o/. In the conversion rule storing unit 13, a first threshold value condition "50" is stored in correspondence with the second phoneme /o/ in the phoneme string /t/ /o/ /o/. Further, in the conversion rule storing unit 13, a first threshold value condition "70" is stored in correspondence with the third phoneme /o/ in the phoneme string /t/ /o/ /o/.

The phoneme string converting unit 14 converts the pronunciation of the recognized word stored in the recognized-word storing unit 12 into a phoneme string in accordance with the conversion rule stored in the conversion rule storing unit 13. Actually the phoneme string converting unit 14 converts the pronunciations of all the recognized words stored in the recognized-word storing unit 12 into phoneme strings in accordance with the conversion rules. In the present embodiment, however, for simplifying the explanation, it is assumed that the pronunciation 'toyotomi' of a recognized word is converted into a phoneme string /toyotomi/ in accordance with the conversion rules 'to'< >/t/ /o/, 'yo'< >/y/ /o/, and 'mi< >/m/ /i/. It is assumed also that the phoneme string converting unit 14 has converted the pronunciation 'toyotomi' of the recognized word into the phoneme string /tootomi/ in accordance with the conversion rules of 'toyo'< >/t/ /o/ /o/, 'to'< >/t/ /o/, and 'mi< >/m/ /i/.

The phoneme model storing unit 15 stores a standard pattern obtained by modeling information about which phoneme tends to become what kind of feature amount. FIG. 5 is a diagram illustrating an example of data contents to be stored in the phoneme model storing unit 15. As illustrated in FIG. 5, standard patterns of phonemes are stored in the phoneme model storing unit 15. For the standard patterns of phoneme, for example, HMM (Hidden Markov Model), a phoneme template (representative point) or the like is used.

The word model generating unit 16 extracts the standard pattern of phonemes stored in the phoneme model storing unit 15 on the basis of the phoneme string converted by the phoneme string converting unit 14. In the present embodiment, the word model generating unit 16 extracts the standard pattern of the phoneme /t, the standard pattern of the phoneme /o/, the standard pattern of the phoneme /y/, the standard pattern of the phoneme /m/ and the standard pattern of the phoneme /i/, on the basis of the phoneme string /toyotomi/ and the phoneme string /tootomi/ converted by the phoneme string converting unit 14. The word model generating unit 16 generates a word model of "toyotomi" by linking the standard patterns of the thus extracted phonemes in accordance with the phoneme string /toyotomi/. Similarly, the word model generating unit 16 generates a word model of "tootomi" by linking the extracted standard patterns of the phonemes in accordance with the phoneme string /tootomi/. Namely, the word model is composed of a standard pattern string. The thus generated word model is stored in the internal memory.

The speech collating unit 17 collates the feature amount converted by the speech analyzing unit 11 and the word model generated by the word model generating unit 16. As a result of the collation, the speech collating unit 17 calculates similarities at each time between the feature amount converted by the speech analyzing unit 11 and the word model generated by the word model generating unit 16. The speech collating unit 17 extracts a word model that satisfies all of the following (1) to (3) from the word models generated by the word model generating unit 16. The speech collating unit 17 outputs, as a recognition result, a recognized word that corresponds to the extracted word model. Here, the threshold value $T_1$ in (1) below is recorded in advance on the internal memory. In the present embodiment, the threshold value $T_1$ is set to "60". Similarly, the threshold value $T_2$ in (2) below is recorded in advance on the internal memory. In the present embodiment, the threshold value $T_2$ is set to "50".

(1) The average value of similarity at each time is equal to or higher than a threshold value $T_1$.
(2) The minimum similarity among the similarities at each time is equal to or higher than a threshold value $T_2$.
(3) The similarity at each time in a section among vocalization sections of utterance speech and corresponding to either a phoneme or a phoneme string associated with a first threshold value condition is equal to or higher than a threshold value C indicated by the first threshold value condition.

Figure 6:
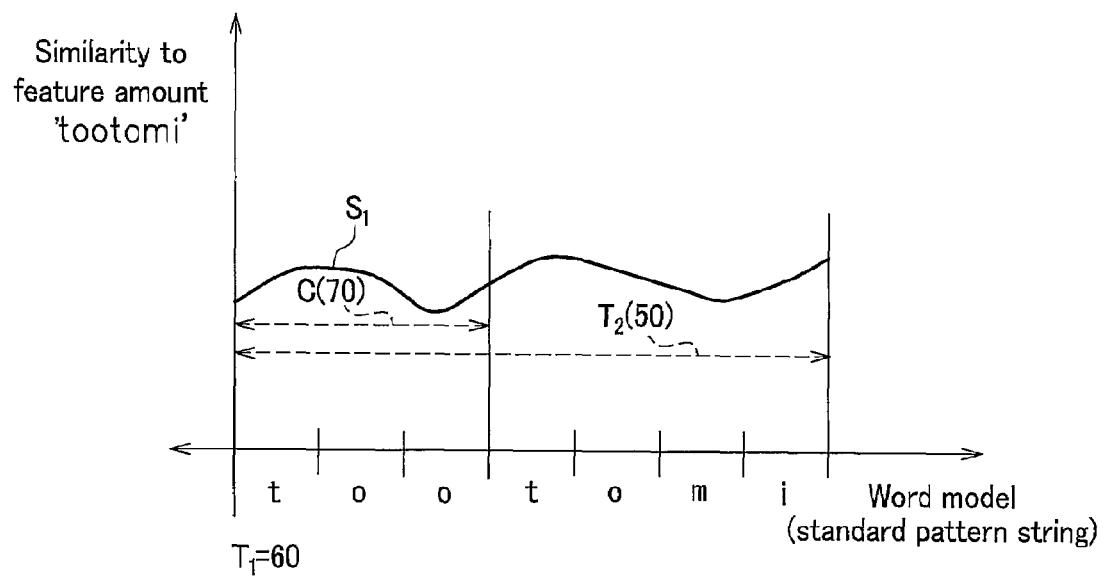
FIG. 6 is a diagram schematically illustrating a similarity at each time between a feature amount 'tootomi and a word model "tootomi".

The following explanation refers to a case where a user vocalizes a recognized word 'toyotomi. In this case, since 'yo' in the vocalized 'toyotomi is an ambiguous vocalization, the speech recognition apparatus 1 determines that the vocalization is 'o'(phoneme: /o/) caused by omission of a phoneme /y/ from 'yo' (phoneme:/yo/) of 'toyotomi, and accordingly determines that the utterance speech is 'tootomi. Specifically, the speech collating unit 17 performs a collation process between the feature amount 'tootomi converted by the speech analyzing unit 11 and the word model "tootomi" generated by the word model generating unit 16. This collation process will be explained with reference to FIG. 6. FIG. 6 is a diagram illustrating schematically as time series data $S_1$ the similarities at each time between the feature amount 'tootomi and the word model "tootomi".

The speech collating unit 17 first calculates the average value of the similarities at each time (overall similarity). In the present embodiment, the average value of similarity at each time is set to "85". Therefore, the speech collating unit 17 determines that the calculated average value of similarity is equal to or higher than the threshold value $T_1$. Instead of calculating the average value of similarity at each time, the speech collating unit 17 can calculate the total of the similarities at each time. Namely, the average value of the similarities at each time or the total of the similarities at each time will be a form of the overall similarity of the present invention. The speech collating unit 17 further determines that the minimum similarity among the similarities at each time is equal to or higher than the threshold value $T_2$. Furthermore, the speech collating unit 17 determines that the similarity at each time in a section among vocalization sections of utterance speech and corresponding to the phoneme string /t/ /o/ /o/ associated with the first threshold value condition is equal to or higher than the threshold value C "70" indicated by the first threshold value condition.

Accordingly, since the word model "tootomi" satisfies all of the above (1) to (3), the speech collating unit 17 outputs as the recognition result the recognized word 'toyotomi corresponding to the word model "tootomi". Thereby, the speech recognition apparatus 1 according to the present embodiment can recognize an utterance speech 'tootomi including an ambiguous phoneme in a case where the user vocalizes the recognized word 'toyotomi.

Figure 7:
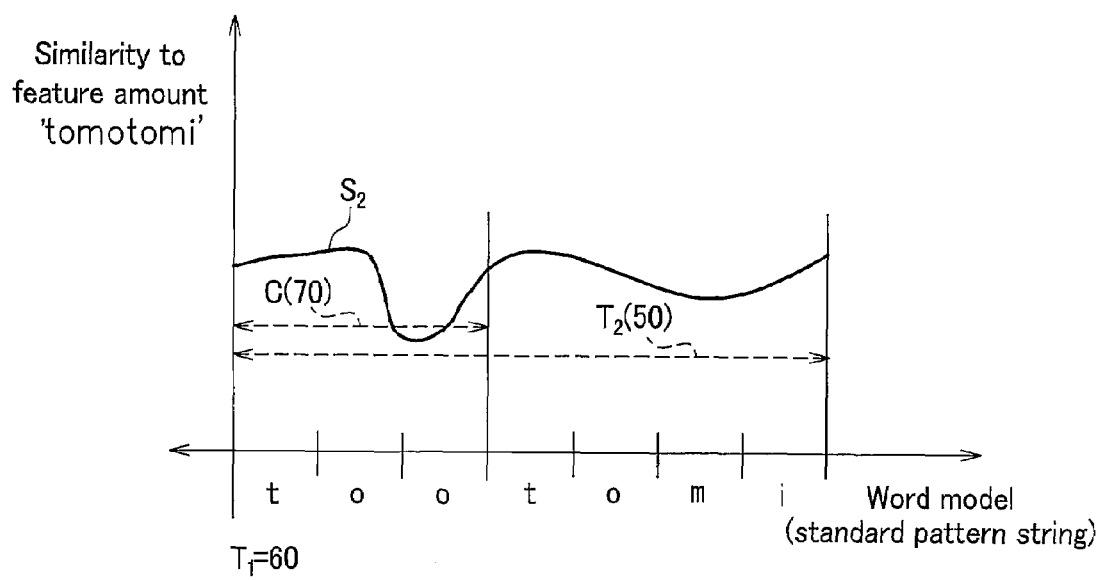
FIG. 7 is a diagram schematically illustrating a similarity at each time between a feature amount 'tomotomi and a word model "tootomi".

The following explanation refers to a case where the user vocalizes a word 'tomotomi other than the recognized word 'toyotomi. Specifically, the speech collating unit 17 performs a collation between the feature amount 'tomotomi converted by the speech analyzing unit 11 and the word model "tootomi" generated by the word model generating unit 16. The process is explained with reference to FIG. 7. FIG. 7 is a diagram illustrating schematically as the time series data $S_2$ the similarities at each time between the feature amount 'tomotomi' and the word model "tootomi".

The speech collating unit 17 first calculates the average value of similarity at each time. In the present embodiment, the average value of similarity at each time is set to "75". Therefore, the speech collating unit 17 determines that the calculated average value of similarity is equal to or higher than the threshold value $T_1$. The speech collating unit 17 further determines that the minimum similarity among the similarities at each time is equal to or higher than the threshold value $T_2$. Furthermore, the speech collating unit 17 determines that the similarity at each time in a section among vocalization sections and corresponding to the phoneme string /t/ /o/ /o/ associated with the first threshold value condition is lower than the threshold value C "70" indicated by the first threshold value condition.

Accordingly, since the word model "tootomi" satisfies the above (1) and (2) but does not satisfy the above (3), the speech collating unit 17 does not output as the recognition result the recognized word 'toyotomi' corresponding to the word model "tootomi". Thereby, when the user vocalizes the word 'tomotomi other than the recognized word 'toyotomi, the speech recognition apparatus 1 according to the present embodiment can prevent the vocalized word from being misrecognized as the recognized word.

In the meantime, the above-described speech recognition apparatus 1 can be obtained also by installing a program in an arbitrary computer such as a personal computer. Namely, the above-mentioned speech analyzing unit 11, the phoneme string converting unit 14, the word model generating unit 16 and the speech collating unit 17 are embodied as a result that the CPU of the computer operates in accordance with the program for embodying these functions. Therefore, a program for embodying the functions of the speech analyzing unit 11, the phoneme string converting unit 14, the word model generating unit 16 and the speech collating unit 17 or a recording medium on which the program is recorded also provide a form of the present invention. The recognized-word storing unit 12, the conversion rule storing unit 13 and the phoneme model storing unit 15 are embodied by the internal storing device of the computer or a recording device accessible from this computer.

Next, operations of the speech recognition apparatus 1 configured as described above will be explained with reference to FIG. 8.

Figure 8:
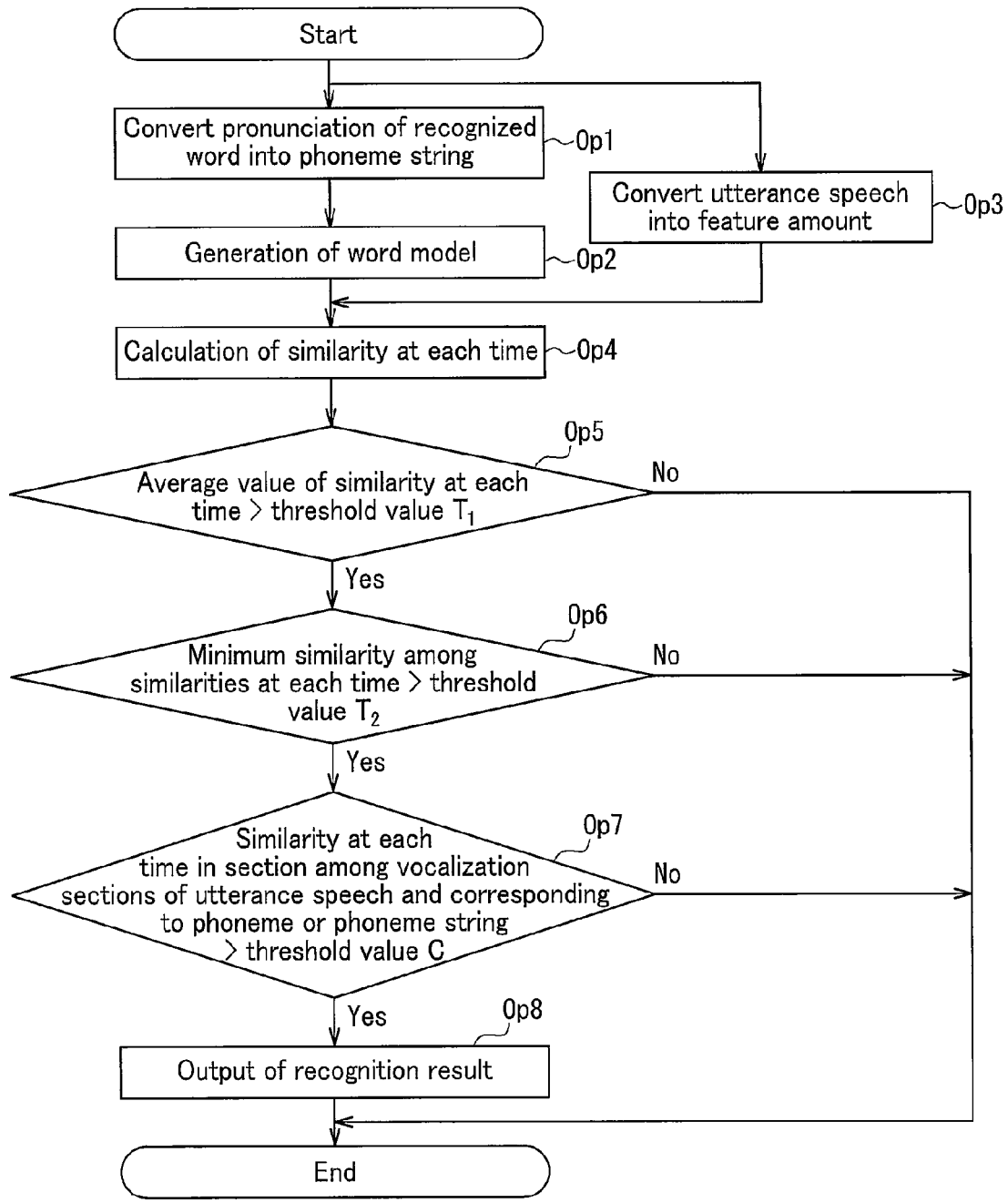
FIG. 8 is a flow chart illustrating an example of operations of the speech recognition apparatus.

FIG. 8 is a flow chart illustrating an example of operations of the speech recognition apparatus 1. Namely, as illustrated in FIG. 8, the phoneme string converting unit 14 converts the pronunciation of the recognized word stored in the recognized-word storing unit 12 into a phoneme string in accordance with the conversion rule stored in the conversion rule storing unit 13 (step Op1). The word model generating unit 16 extracts the standard patterns of the phonemes stored in the phoneme model storing unit 15, on the basis of the phoneme string converted in the step Op1. The word model generating unit 16 generates a word model by linking the standard patterns of the extracted phonemes in accordance with the phoneme string (step Op2). The thus generated word model is recorded on the internal memory.

Meanwhile, the speech analyzing unit 11 converts the inputted utterance speech into a feature amount for every frame (step Op3). The converted feature amount is recorded on the internal memory together with frame intrinsic information. Although FIG. 8 refers to an embodiment where the processes of the step Op1 and the step Op2 are executed in parallel with the process of step Op3, it is also possible to choose an embodiment where the processes of the step Op1 to the step Op3 are executed serially.

The speech collating unit 17 calculates similarities at each time between the feature amount converted in the step Op3 and the word model generated in the step Op2 (step Op4). The speech collating unit 17 determines whether the average value of similarity at each time is at least the threshold value $T_1$ or not (step Op5). When determining that the average value of similarity at each time is equal to or higher than the threshold value $T_1$ (YES in the step Op5), the speech collating unit 17 determines whether the minimum similarity among the similarities at each time is at least the threshold value $T_2$ or not (step Op6). When determining that the average value of similarity at each time is lower than the threshold value $T_1$ (NO in the step Op5), the speech collating unit 17 ends the process in FIG. 8.

When determining that the minimum similarity among the similarities at each time is equal to or higher than the threshold value $T_2$ (YES in the step Op6), the speech collating unit 17 determines whether the similarity at each time in a section among vocalization sections of utterance speech and corresponding to either the phoneme or the phoneme string associated with the first threshold value condition is equal to or higher than the threshold value C indicated by the first threshold value condition (step Op7). When determining that the minimum similarity among the similarities at each time is lower than the threshold value $T_2$ (NO in the step Op6), the speech collating unit 17 ends the process in FIG. 8.

When determining that the similarity at each time in a section among vocalization sections of utterance speech and corresponding to either a phoneme or a phoneme string associated with the first threshold value condition is equal to or higher than the threshold value C indicated by the first threshold value condition (YES in the step Op7), the speech collating unit 17 outputs as the recognition result a recognized word corresponding to the word model generated in the step Op2 (step Op8). When determining that the similarity at each time in a section among vocalization sections of utterance speech and corresponding to either a phoneme or a phoneme string associated with the first threshold value condition is lower than the threshold value C indicated by the first threshold value condition (NO in the step Op7), the speech collating unit 17 ends the process in FIG. 8.

As mentioned above, in the speech recognition apparatus 1 according to the present embodiment, the first threshold value condition is set to recognize an utterance speech including an ambiguous phoneme in a case where a human being vocalizes a recognized word, and the first threshold value condition is set so that, when a human being vocalizes a word other than the recognized word, the vocalized word can be rejected. Thereby, the speech recognition apparatus 1 of the present embodiment can recognize an utterance speech including an ambiguous phoneme in a case where a human being vocalizes a recognized word and at the same time, when the human being vocalizes a word other than the recognized word, the speech recognition apparatus 1 can prevent the vocalized word from being misrecognized as the recognized word.

In the above-mentioned example, the speech collating unit 17 outputs a recognition result when it determines the similarity at each time in a section among the vocalization sections of the utterance speech and corresponding to either the phoneme or the phoneme string associated with the first threshold value condition is equal to or higher than the threshold value C indicated by the first threshold value condition, but the present invention is not limited thereto. In an alternative example where the threshold value indicated by the first threshold value condition is set to a predetermined range, the speech collating unit 17 can output the recognition result when it determines that the similarity at each time in a vocalization section of an utterance speech corresponding to a standard pattern of a phoneme or a standard pattern string of a phoneme string is within a predetermined range.

Alternatively, the speech collating unit 17 can output the recognition result when it determines that the similarity at each time in the section among the vocalization sections of utterance speech and corresponding to either a phoneme or a phoneme string associated with the first threshold value condition is lower than the threshold value C indicated by the first threshold value condition. The following description refers to a case where a first threshold value condition "95" is stored in the conversion rule storing unit 13 in accordance with the phoneme string /t/ /o/ /o/ of the conversion rule 'toyo'<>/t/ /o/ /o/. It is assumed that the speech collating unit 17 has calculated the similarity at each time between the utterance speech 'tootomi' and the word model "tootomi". In this case, when the similarity at each time in the section among the vocalization sections of utterance speech and corresponding to the phoneme string /t/ /o/ /o/ associated with the first threshold value condition is equal to or higher than the threshold value "95" indicated by the first threshold value condition, the speech collating unit 17 determines that the utterance speech does not become 'tootomi in a case where the user vocalizes the recognized word 'toyotomi, but that the user vocalizes clearly a word 'tootomi other than the recognized word 'toyotomi. Therefore, in such a case, the speech collating unit 17 rejects the utterance speech 'tootomi.

Second Embodiment

Figure 9:
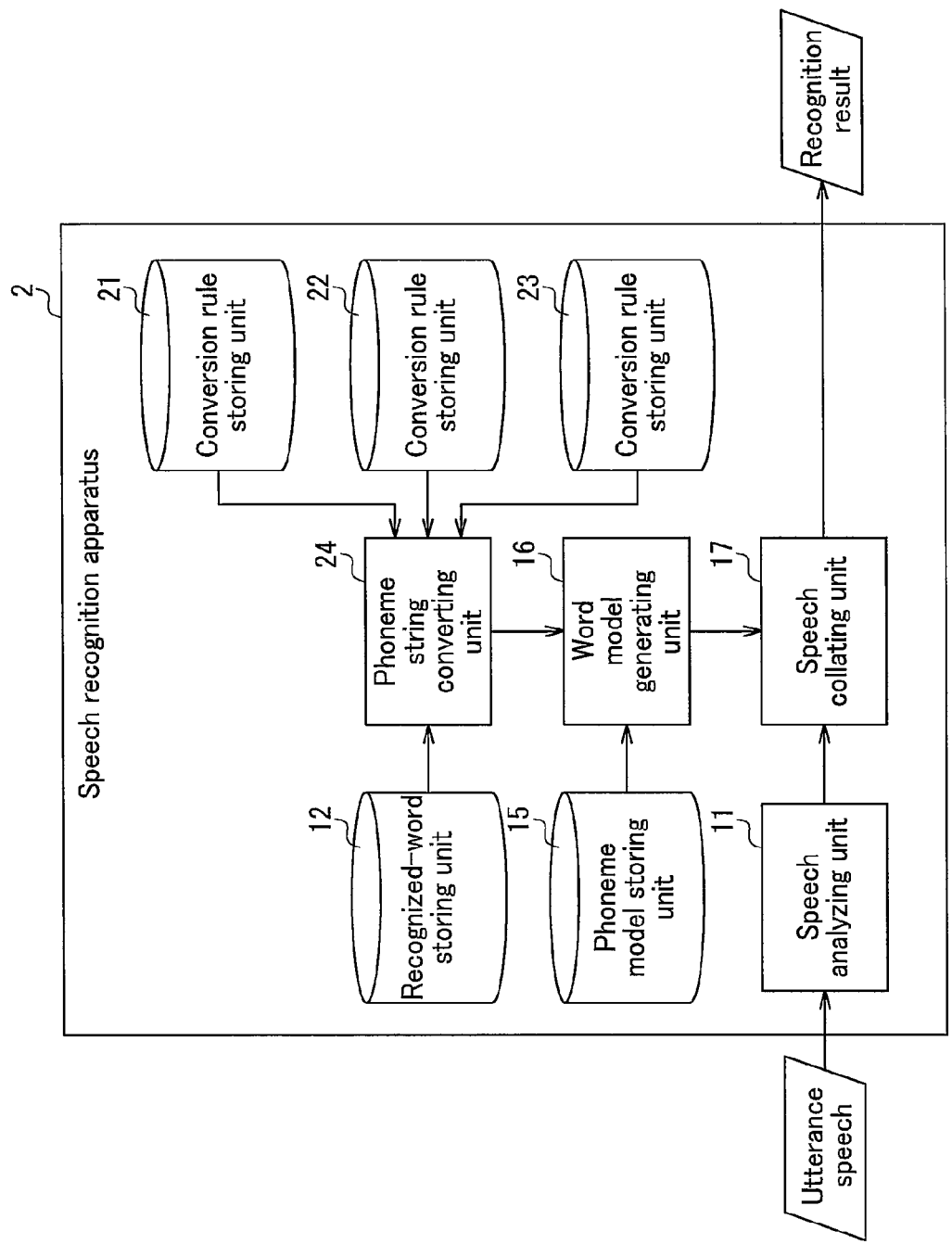
FIG. 9 is a block diagram illustrating a schematic configuration of a speech recognition apparatus according to a second embodiment of the present invention.

FIG. 9 is a block diagram illustrating a schematic configuration of a speech recognition apparatus 2 according to the present embodiment. Namely, the speech recognition apparatus 2 in the present embodiment includes conversion rule storing units 21-23 in place of the conversion rule storing unit 13 as illustrated in FIG. 1. Although three conversion rule storing units 21-23 are illustrated in FIG. 9 for helping the understanding, the number of the conversion rule storing units included in the speech recognition apparatus 2 can be determined arbitrarily. Further, the speech recognition apparatus 2 according to the present embodiment includes a phoneme string converting unit 24 in place of the phoneme string converting unit 14 as illustrated in FIG. 1. In FIG. 9, components functioning as those in FIG. 1 are assigned with the identical reference signs in order to avoid duplicated explanation.

Similarly to the conversion rule storing unit 13 as illustrated in FIG. 1, the conversion rule storing units 21-23 store at least either the conversion rule between a pronunciation and a phoneme or the conversion rule between a pronunciation and a phoneme string. Further, similarly to the conversion rule storing unit 13 as illustrated in FIG. 1, the conversion rule storing units 21-23 store a first threshold value condition associated with a phoneme or a phoneme string. A plurality of the conversion rule storing units 21-23 are provided for every condition indicated by the first threshold value condition. In the present embodiment, as illustrated in FIG. 10A a conversion rule associated with a first threshold value condition "NONE" ("–" in FIG. 10A) is stored in the conversion rule storing unit 21. For example, ordinary conversion rules such as 'mi<>/m/ /i/ are stored in the conversion rule storing unit 21. Further, in the conversion rule storing unit 22, a conversion rule associated with the first threshold value condition "70" is stored as illustrated in FIG. 10B. The conversion rule storing unit 22 stores a conversion rule for a phoneme string including a phoneme that tends to be ambiguous when a human being vocalizes the recognized word 'toyotomi. Further, as illustrated in FIG. 10C, a conversion rule associated with the first threshold value condition "80" is stored in the conversion rule storing unit 23. The conversion rule storing unit 23 stores a conversion rule of a phoneme string including a phoneme that seldom may be ambiguous when a human being vocalizes the recognized word 'toyotomi.

Though FIG. 9 illustrates an example where the conversion rule storing units 21-23 are composed of a pieces of hardware different from each other, the present invention is not limited to this example. For example, the conversion rule storing units 21-23 can be formed on areas different from each other in the same hardware.

The phoneme string converting unit 24 selects, from the plural conversion rule storing units 21-23, a conversion rule storing unit to be used for converting the pronunciation of the recognized word into a phoneme string, on the basis of the number of the pronunciations of the recognized word stored in the recognized-word storing unit 12. In the present embodiment, the phoneme string converting unit 24 selects the conversion rule storing units 21, 22 when the number of the pronunciations of the recognized words is as great as 1000 or more. On the other hand, when the number of the pronunciations of the recognized word is as small as less than 1000, the phoneme string converting unit 24 selects all of the conversion rule storing units 21-23. The phoneme string converting unit 24 converts the pronunciation of the recognized word stored in the recognized-word storing unit 12 into a phoneme string in accordance with the conversion rules stored in the selected conversion rule storing unit.

As mentioned above, when the number of the pronunciations of the recognized word is as great as 1000 or more for example, the speech recognition apparatus 2 according to the present embodiment can convert the pronunciation of the recognized word into a phoneme string by using the minimum numbers of conversion rule storing units 21, 22. Therefore, it is possible to suppress deterioration in the speed of collation by the speech collating unit 17. To the contrary, for example, when the number of the pronunciations of the recognized word is as small as less than 1000, the phoneme string converting unit 24 can convert the pronunciation of the recognized word by using all of the conversion rule storing units 21-23. Therefore, the speech collating unit 17 can recognize reliably an utterance speech including an ambiguous phoneme in a case where a human being vocalizes the recognized word.

Third Embodiment

Figure 11:
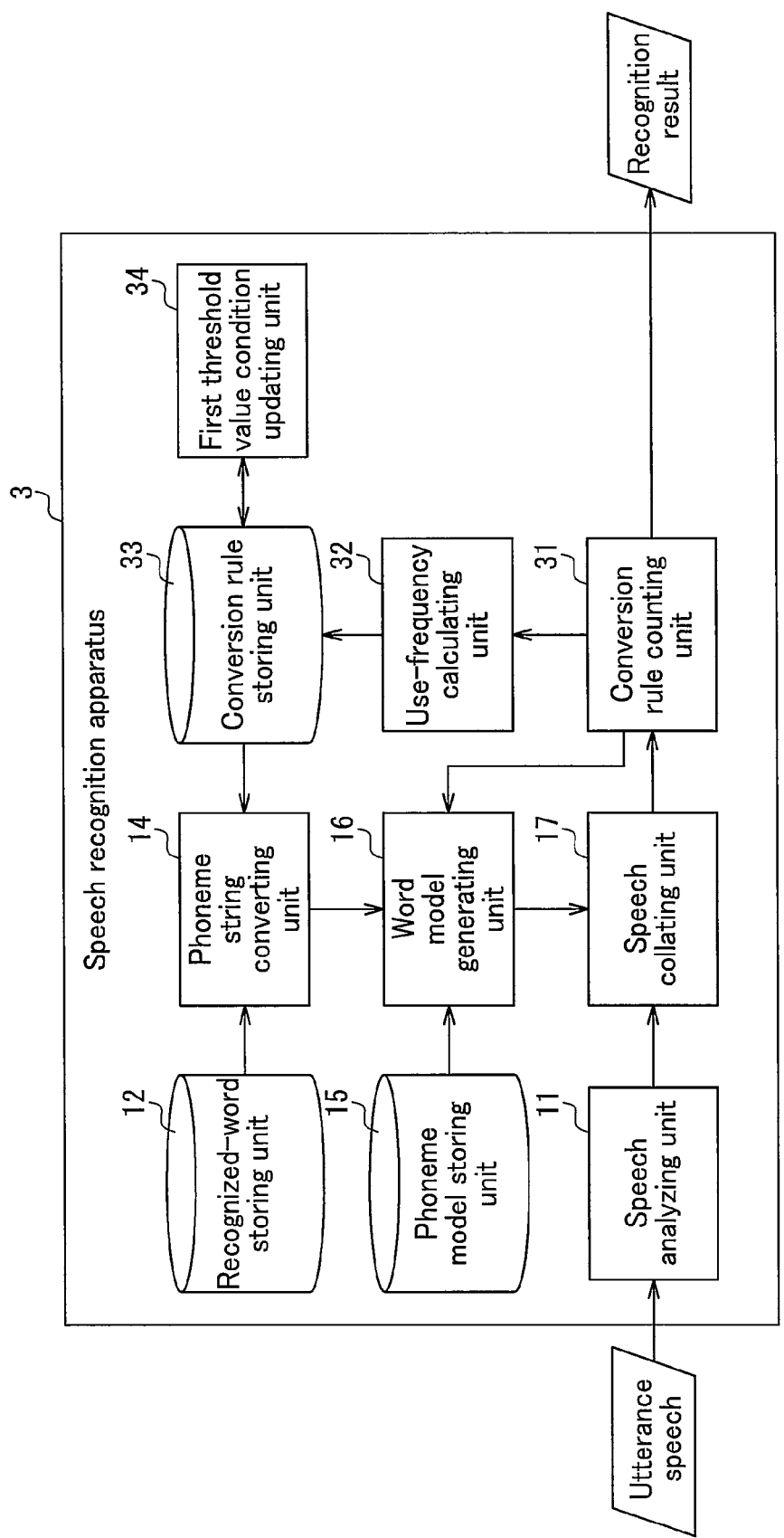
FIG. 11 is a block diagram illustrating a schematic configuration of a speech recognition apparatus according to a third embodiment of the present invention.

FIG. 11 is a block diagram illustrating a schematic configuration of a speech recognition apparatus 3 according to the present embodiment. Namely, the speech recognition apparatus 3 according to the present embodiment includes the components of the speech recognition apparatus 1 as illustrated in FIG. 1 and further a conversion rule counting unit 31, a use-frequency calculating unit 32 and a first threshold value condition updating unit 34. The speech recognition apparatus 3 according to the present embodiment includes further a conversion rule storing unit 33 in place of the conversion rule storing unit 13 as illustrated in FIG. 1. The above-mentioned conversion rule counting unit 31, the use-frequency calculating unit 32 and the first threshold value condition updating unit 34 will be embodied also as a result that the CPU of a computer operates corresponding to a program for embodying this function. In FIG. 11, components functioning as those in FIG. 1 are assigned with the identical reference signs in order to avoid duplicated explanation.

The conversion rule counting unit 31 counts the conversion rules used for generating the word model corresponding to the recognized word of the recognition result outputted by the speech collating unit 17. For example, in a case where the recognized word of a recognition result outputted by the speech collating unit 17 is 'toyotomi, the conversion rule counting unit 31 extracts a word model "tootomi" corresponding to the recognized word 'toyotomi' by referring to the word model generating unit 16. Further, the conversion rule counting unit 31 counts the conversion rules that have been used for generating the word model "tootomi". In the present embodiment, the conversion rule counting unit 31 counts that the conversion rule 'toyo'< >/t/ /o/ /o/ is "1", the conversion rule 'to'< >/t/ /o/ is "1", and the conversion rule 'mi< >/m/ /i/ is "1". The conversion rule counting unit 31 outputs the thus counted counter value to the use-frequency calculating unit 32. Here, the conversion rule counting unit 31 outputs directly the recognition result outputted by the speech collating unit 17 to the exterior.

The use-frequency calculating unit 32 writes the counter value outputted by the conversion rule counting unit 31 to the conversion rule storing unit 33 for every conversion rule.

Here, when a counter value of a conversion rule is outputted further by the conversion rule counting unit 31, the use-frequency calculating unit 32 extracts a counter value of a conversion rule stored in the conversion rule storing unit 33, and calculates the sum (cumulative value) of the counter value of the extracted conversion rule and the counter value of the conversion rule outputted from the conversion rule storing unit 31. The use-frequency calculating unit 32 sets the calculated cumulative value as a use-frequency. The use-frequency calculating unit 32 updates the counter value stored in the conversion rule storing unit 33 to the calculated cumulative value. That is, the use-frequency calculating unit 32 calculates afresh a cumulative value each time a counter value of a conversion rule is outputted from the conversion rule counting unit 31, and updates the cumulative value stored in the conversion rule storing unit 33. Though the use-frequency calculating unit 32 sets the cumulative value of a conversion rule as the use-frequency in the above description, the present invention is not limited to this example. Alternatively for example, the use-frequency calculating unit 32 can set the ratio of the cumulative value of the conversion rule to the sum of the cumulative values of all the conversion rules, as the use-frequency.

The conversion rule storing unit 33 stores the conversion rules stored in the conversion rule storing unit 13 and the first threshold value condition as illustrated in FIG. 1, and further a use-frequency of the conversion rule (cumulative value). FIG. 12 is a diagram illustrating an example of data contents to be stored in the conversion rule storing unit 33. As illustrated in FIG. 12, in the conversion rule storing unit 33, a conversion rule, a first threshold value condition, and a use-frequency of the conversion rule are stored. For example, the use-frequency "11" of the conversion rule 'toyo'< >/t/ /o/ /o/ indicates that the phoneme string converting unit 14 uses the conversion rule 'toyo'< >/t/ /o/ /o/ eleven times for the purpose of generating a word model corresponding to the recognized word of the recognition result outputted by the speech collating unit 17.

When the use-frequency of the conversion rule is higher than the boundary condition, the first threshold value condition updating unit 34 updates the first threshold value condition associated with the phoneme or the phoneme string of this conversion rule so that the first threshold value condition is lowered. When the use-frequency of the conversion rule is lower than the boundary condition, the first threshold value condition updating unit 34 updates the first threshold value condition associated with the phoneme or the phoneme string of this conversion rule so that the first threshold value condition is raised.

Specifically, the first threshold value condition updating unit 34 extracts at a arbitrary timing the use-frequency of the conversion rule stored in the conversion rule storing unit 33. It is assumed in the present embodiment that the first threshold value condition updating unit 34 has extracted the use-frequency "11" of the conversion rule 'toyo'< >/t/ /o/ /o/. The first threshold value condition updating unit 34 determines whether the use-frequency of the extracted conversion rule is higher than the boundary condition or not. The boundary condition is recorded in advance on the internal memory. In the present embodiment, the boundary condition is set to "10". In the present embodiment, since the use-frequency "11" of the extracted conversion rule 'toyo'< >/t/ /o/ /o/ is higher than the boundary condition "10", the first threshold value condition updating unit 34 updates the first threshold value condition stored in the conversion rule storing unit 33 so that the first threshold value condition "70" associated with the phoneme string /t/ /o/ /o/ of the conversion rule 'toyo'<

>/t/ /o/ /o/ is lowered. FIG. 13 is a diagram illustrating an example of data contents to be stored in the conversion rule storing unit 33 after being updated by the first threshold value condition updating unit 34. As illustrated in FIG. 13, the first threshold value condition of 'toyo'< >/t/ /o/ /o/ is updated from "70" to "65" by the first threshold value condition updating unit 34.

Assuming that the boundary condition is "15", since the use-frequency "11" of the extracted conversion rule 'toyo'< >/t/ /o/ /o/ is lower than the boundary condition "15", the first threshold value condition updating unit 34 updates the first threshold value condition stored in the conversion rule storing unit 33 so that the first threshold value condition "70" associated with the phoneme string /t/ /o/ /o/ of the conversion rule 'toyo'< >/t/ /o/ /o/ is raised. FIG. 14 is a diagram illustrating an example of data contents to be stored in the conversion rule storing unit 33 after being updated by the first threshold value condition updating unit 34. As illustrated in FIG. 14, the first threshold value condition of the conversion rule 'toyo'< >/t/ /o/ /o/ is updated from "70" to "75" by the first threshold value condition updating unit 34.

Next, operations of the speech recognition apparatus 3 configured as described above will be described with reference to FIG. 15.

Figure 15:
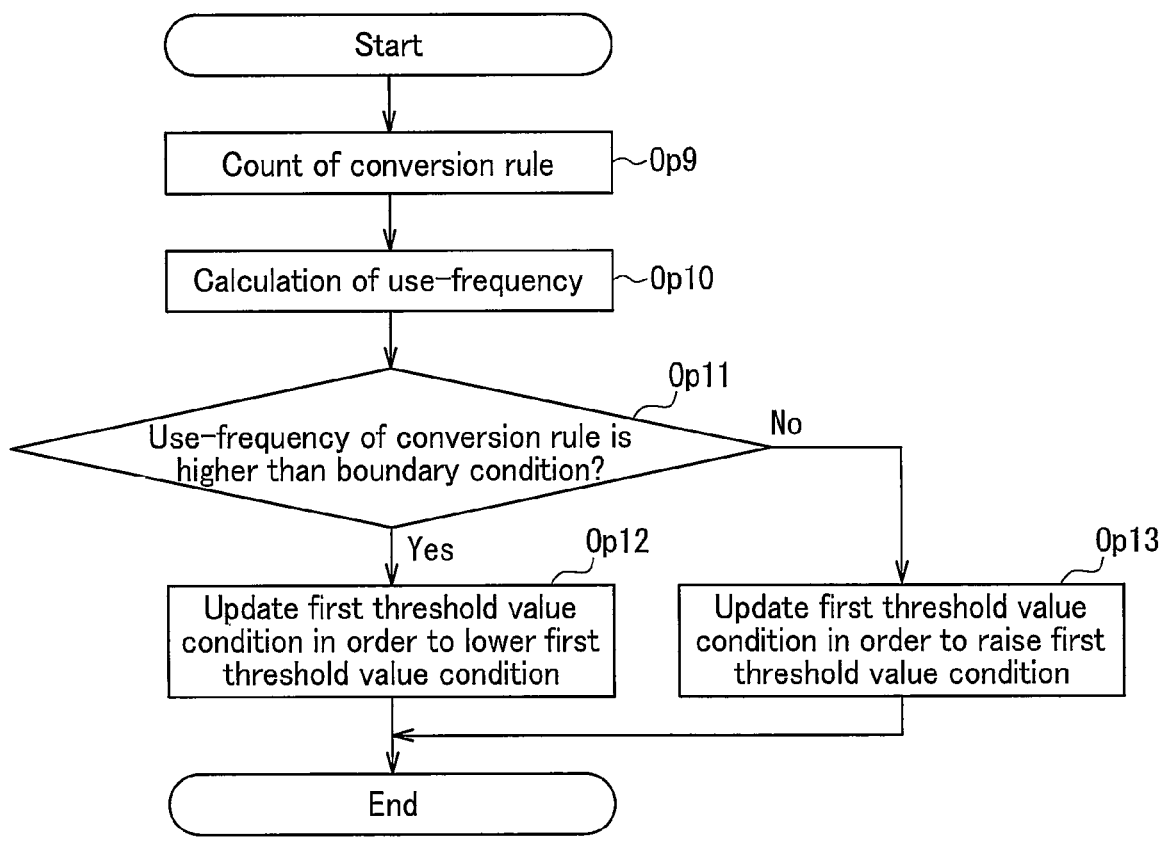
FIG. 15 is a flow chart illustrating an example of operations of the speech recognition apparatus.

FIG. 15 is a flow chart illustrating an example of operations of the speech recognition apparatus 3. That is, as illustrated in FIG. 15, the conversion rule counting unit 31 counts conversion rules that have been used for generating a word model corresponding to the recognized word of a recognition result outputted in the step Op8 as illustrated in FIG. 8 (step Op9). The use-frequency calculating unit 32 calculates the use-frequency (cumulative value) of the conversion rule by accumulating the counter values counted in the step Op9 (step Op10). The use-frequency calculating unit 32 writes the use-frequency of the calculated conversion rule to the conversion rule storing unit 33.

When the use-frequency of the conversion rule calculated in the step Op10 is higher than the boundary condition (YES in step Op11), the first threshold value condition updating unit 34 updates the first threshold value condition associated with the phoneme or the phoneme string of this conversion rule so that the first threshold value condition is lowered (step Op12). When the use-frequency of the conversion rule calculated in the step Op10 is lower than the boundary condition (NO in the step Op11), the first threshold value condition updating unit 34 updates the first threshold value condition associated with the phoneme or the phoneme string of this conversion rule so that the first threshold value condition is raised (step Op13).

As mentioned above, when the use-frequency of the conversion rule in the speech recognition apparatus 3 according to the present invention is higher, the conversion rule is used frequently for generating a word model. In such a case, the first threshold value condition updating unit 34 can update the first threshold value condition so as to lower the first threshold value condition. Thereby, the recognition rate of the speech recognition apparatus 3 is improved. In contrast, when the use-frequency of the conversion rule is low, this conversion rule is not used frequently for generating a word model. In such a case, the first threshold value condition updating unit 34 can update the first threshold value condition so as to raise the first threshold value condition. Thereby, the recognition rate of the speech recognition apparatus 3 is lowered.

Fourth Embodiment

Figure 16:
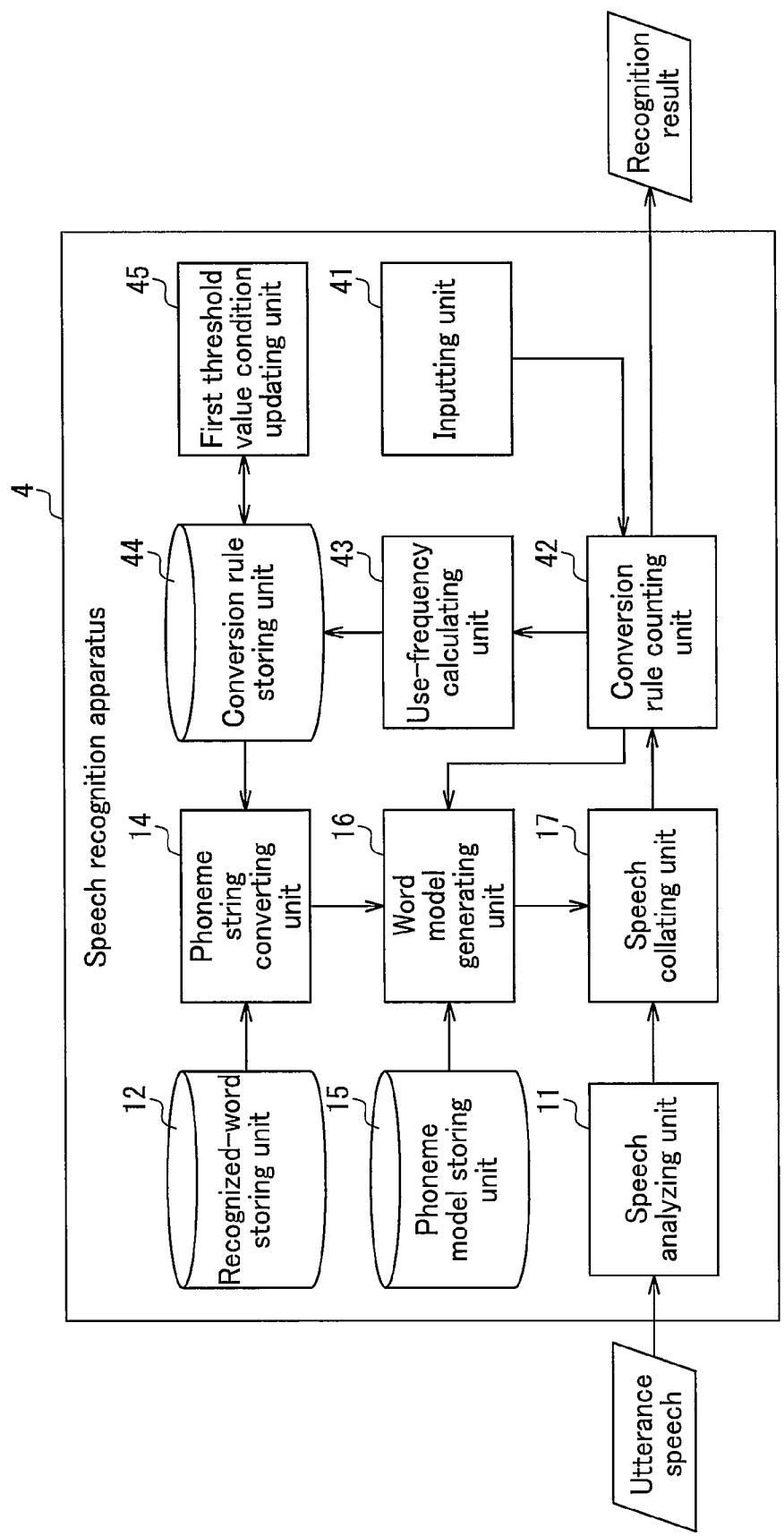
FIG. 16 is a block diagram illustrating a schematic configuration of a speech recognition apparatus according to a fourth embodiment of the present invention.

FIG. 16 is a block diagram illustrating a schematic configuration of a speech recognition apparatus 4 according to the present embodiment. Namely, the speech recognition apparatus 4 according to the present embodiment includes the components of the speech recognition apparatus 1 as illustrated in FIG. 1, and also an inputting unit 41, a conversion rule counting unit 42, a use-frequency calculating unit 43 and a first threshold value condition updating unit 45. Furthermore, the speech recognition apparatus 4 according to the present embodiment includes a conversion rule storing unit 44 in place of the conversion rule storing unit 13 as illustrated in FIG. 1. The inputting unit 41, the conversion rule counting unit 42, the use-frequency calculating unit 43 and the first threshold value condition updating unit 45 as mentioned above can be embodied also as a result that the CPU of a computer operates in accordance with a program for embodying this function. In FIG. 16, components functioning as those in FIG. 1 are assigned with the identical reference signs in order to avoid duplicated explanation.

The inputting unit 41 accepts from the user a decision whether the recognition result outputted by the speech collating unit 17 is incorrect or not. In the present embodiment, when the recognition result is incorrect, the inputting unit 41 accepts from the user a decision that the recognition result is incorrect. The inputting unit 41 is composed of an arbitrary inputting device such as a keyboard, a mouse, a numeric keypad, and a touch panel.

When accepting from the user a decision that the recognition result is incorrect, the conversion rule counting unit 42 counts the conversion rules that have been used to generate a word model corresponding to the recognized word of this recognition result. For example, when accepting from the user a decision that the recognition result 'toyotomi' is incorrect, the conversion rule counting unit 42 extracts the word model "tootomi" corresponding to the recognized word 'toyotomi' by referring to the word model generating unit 16. Further, the conversion rule counting unit 42 counts the conversion rules that have been used for generating the word model "tootomi". In the present embodiment, the conversion rule counting unit 42 counts that the conversion rule 'toyo'< >/t/ /o/ /o/ is "1", the conversion rule 'to'< >/t/ /o/ is "1", and the conversion rule 'mi'< >/m/ /i/ is "1". The conversion rule counting unit 42 outputs the counted counter value to the use-frequency calculating unit 43. Here, the conversion rule counting unit 42 outputs directly a recognition result outputted by the speech collating unit 17 to the exterior.

Similarly to the case of the use-frequency calculating unit 32 as illustrated in FIG. 11, the use-frequency calculating unit 43 writes the counter value outputted from the conversion rule counting unit 42, to the conversion rule storing unit 44 for every conversion rule. Here, in a case where a counter value of a conversion rule is outputted further from the conversion rule counting unit 42, the use-frequency calculating unit 43 extracts a counter value of a conversion rule stored in the conversion rule storing unit 44, and calculates a sum (cumulative value) of the counter value of the extracted conversion rule and the counter value of the conversion rule outputted from the conversion rule counting unit 42. The use-frequency calculating unit 43 sets the calculated cumulative value as a use-frequency. The use-frequency calculating unit 43 updates the counter value stored in the conversion rule storing unit 44 to a cumulative value. Namely, the use-frequency calculating unit 43 calculates afresh the cumulative value each time a counter value is outputted from the conversion rule counting unit 42, and updates the cumulative value stored in the conversion rule storing unit 44.

Similarly to the conversion rule storing unit 33 as illustrated in FIG. 11, the conversion rule storing unit 44 stores conversion rules, a first threshold value condition, and a use-frequency of a conversion rule (cumulative value). FIG. 17 is a diagram illustrating an example of data contents to be stored in the conversion rule storing unit 44. For example, the use-frequency "6" of the conversion rule 'toyo'< >/t/ /o/ /o/ indicates that, in a case of accepting from the user a decision that a recognition result is incorrect, the phoneme string converting unit 14 uses the conversion rule 'toyo'< >/t/ /o/ /o/ six times for generating a word model corresponding to the recognized word of this recognition result.

When the use-frequency of the conversion rule is higher than the boundary condition, the first threshold value condition updating unit 45 updates the first threshold value condition associated with either the phoneme or the phoneme string of this conversion rule so that the first threshold value condition is raised. When the use-frequency of the conversion rule is lower than the boundary condition, the first threshold value condition updating unit 45 updates the first threshold value condition associated with either the phoneme or the phoneme string of this conversion rule, so that the first threshold value condition is lowered.

Specifically, the first threshold value condition updating unit 45 extracts at a arbitrary timing the use-frequency of the conversion rule stored in the conversion rule storing unit 44. It is assumed in the present embodiment that the first threshold value condition updating unit 45 has extracted the use-frequency "6" of the conversion rule 'toyo'< >/t/ /o/ /o/. The first threshold value condition updating unit 45 determines whether the use-frequency of the extracted conversion rule is higher than the boundary condition or not. The boundary condition is recorded in advance on the internal memory. In the present embodiment, the boundary condition is set to "5". In the present embodiment, since the use-frequency "6" of the extracted conversion rule 'toyo'< >/t/ /o/ /o/ is higher than the boundary condition "5", the first threshold value condition updating unit 45 updates the first threshold value condition stored in the conversion rule storing unit 44 so that the first threshold value condition "70" associated with the phoneme string /t/ /o/ /o/ of the conversion rule 'toyo'< >/t/ /o/ /o/ is raised. FIG. 18 is a diagram illustrating an example of data contents to be stored in the conversion rule storing unit 44 after being updated by the first threshold value condition updating unit 45. As illustrated in FIG. 18, the first threshold value condition of 'toyo'< >/t/ /o/ /o/ is updated from "70" to "75" by the first threshold value condition updating unit 45.

Assuming that the boundary condition is "10", since the use-frequency "6" of the extracted conversion rule of 'toyo'< >/t/ /o/ /o/ is lower than the boundary condition "10", the first threshold value condition updating unit 45 updates the first threshold value condition stored in the conversion rule storing unit 44 so that the first threshold value condition "70" associated with the phoneme string /t/ /o/ /o/ of the conversion rule 'toyo'< >/t/ /o/ /o/ is lowered. FIG. 19 is a diagram illustrating an example of data contents to be stored in the conversion rule storing unit 44 after being updated by the first threshold value condition updating unit 45. As illustrated in FIG. 19, the first threshold value condition of 'toyo'< >/t/ /o/ /o/ is updated from "70" to "65" by the first threshold value condition updating unit 45.

Next, operations of the speech recognition apparatus 4 configured as described above will be described with reference to FIG. 20.

Figure 20:
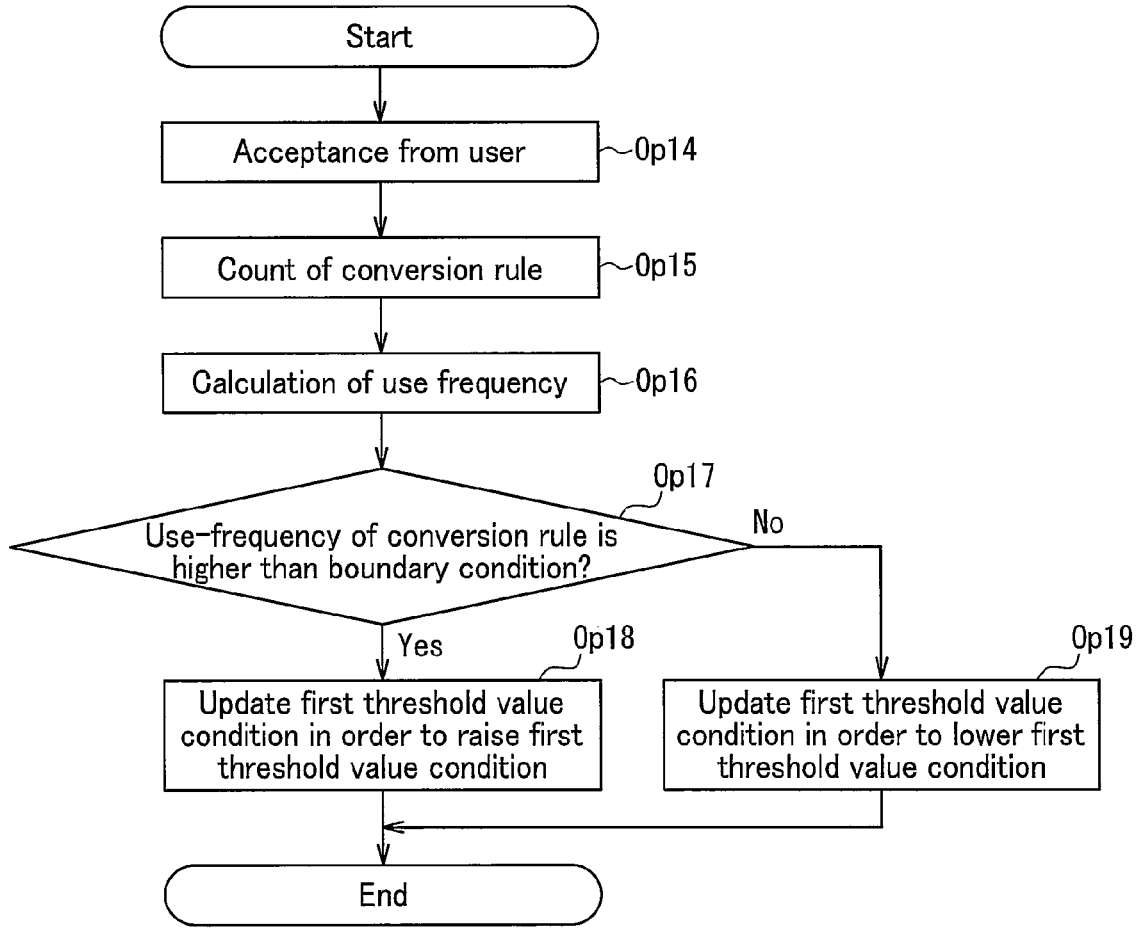
FIG. 20 is a flow chart illustrating an example of operations of the speech recognition apparatus.

FIG. 20 is a flow chart illustrating an example of operations of the speech recognition apparatus 4. That is, as illustrated in FIG. 20, when the recognition result outputted in the step Op8 as illustrated in FIG. 8 is incorrect, the inputting unit 41 accepts from the user a decision that the recognition result is incorrect (step Op14). The conversion rule counting unit 42 counts the conversion rules that have been used for generating a word model corresponding to the recognized word of the recognition result accepted in the step Op14 (step Op15). The use-frequency calculating unit 43 calculates the use-frequency (cumulative value) of the conversion rule by accumulating the counter values counted in the step Op15 (step Op16). The use-frequency calculating unit 43 writes the use-frequency of the calculated conversion rule, to the conversion rule storing unit 44.

When the use-frequency of the conversion rule calculated in the step Op16 is higher than the boundary condition (YES in step Op17), the first threshold value condition updating unit 45 updates the first threshold value condition associated with the phoneme or the phoneme string of this conversion rule so that the first threshold value condition is raised (step Op18). In contrast, when the use-frequency of the conversion rule calculated in the step Op16 is lower than the boundary condition (NO in the step Op17), the first threshold value condition updating unit 45 updates the first threshold value condition associated with the phoneme or the phoneme string of this conversion rule so that the first threshold value condition is lowered (step Op19).

As mentioned above, in the speech recognition apparatus 4 according to the present embodiment, when the use-frequency of the conversion rule is high, the conversion rule is used frequently for generating a word model in a case where the recognized word is incorrect, and thus the first threshold value condition updating unit 45 can update the first threshold value condition so that the first threshold value condition is raised. Thereby, the recognition rate of the speech recognition apparatus 4 is lowered. In contrast, when the use-frequency of the conversion rule is low, this conversion rule is not used frequently for generating a word model in a case where the recognized word is incorrect, and thus the first threshold value condition updating unit 45 can update the first threshold value condition so that the first threshold value condition is lowered. Thereby, the recognition rate of the speech recognition apparatus 4 is improved.

Fifth Embodiment

Figure 21:
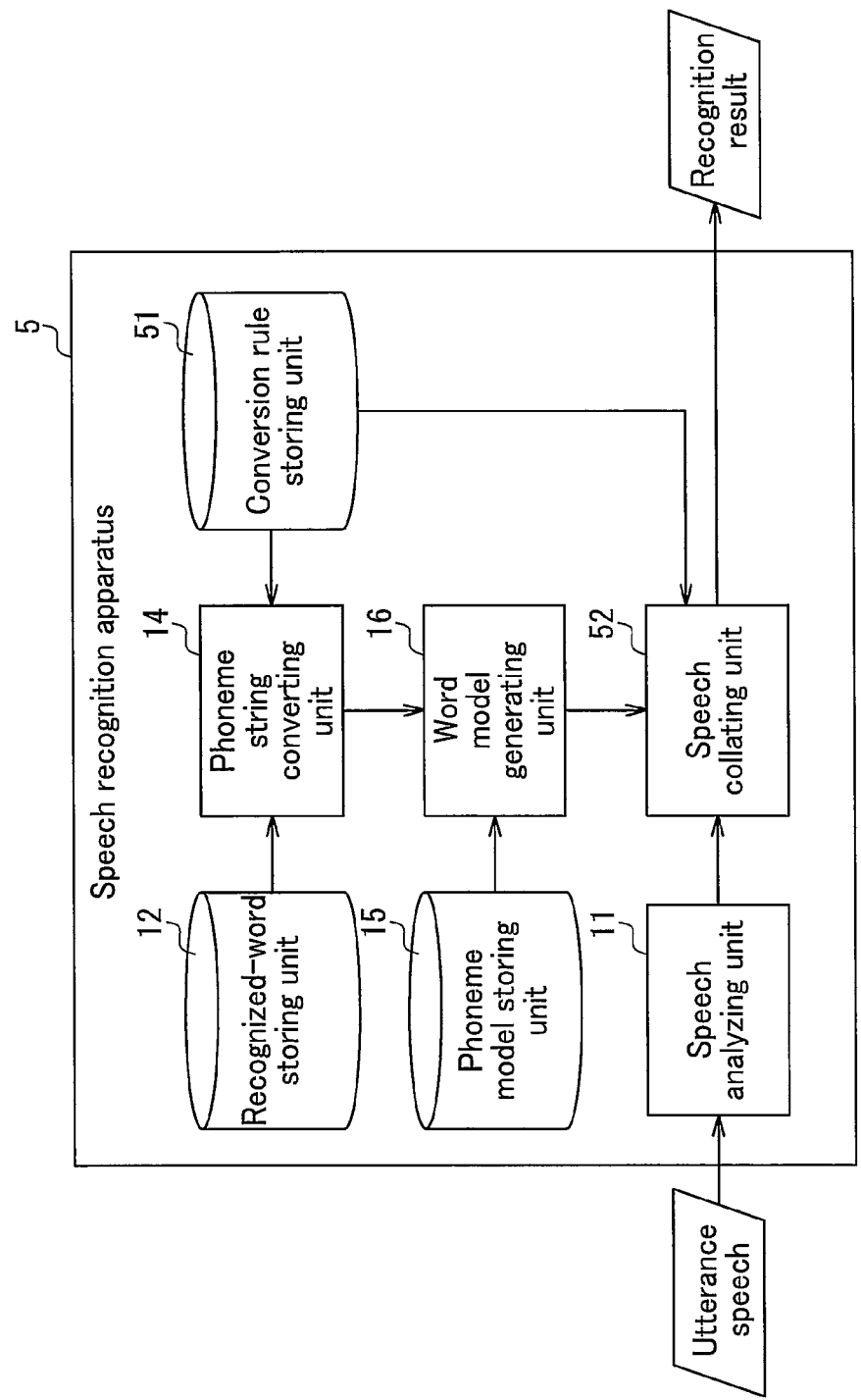
FIG. 21 is a block diagram illustrating a schematic configuration of a speech recognition apparatus according to a fifth embodiment of the present invention.

FIG. 21 is a block diagram illustrating a schematic configuration of a speech recognition apparatus 5 according to the present embodiment. Namely, the speech recognition apparatus 5 according to the present embodiment includes a conversion rule storing unit 51 and a speech collating unit 52 in place of the conversion rule storing unit 13 and the speech collating unit 17 as illustrated in FIG. 1. In FIG. 21, components functioning as those in FIG. 1 are assigned with the identical reference signs in order to avoid duplicated explanation.

The conversion rule storing unit 51 stores a duration, in addition to the conversion rules stored in the conversion rule storing unit 13 as illustrated in FIG. 1 and the first threshold value condition. FIG. 22 is a diagram illustrating an example of data contents to be stored in the conversion rule storing unit 51. As illustrated in FIG. 22, a conversion rule, a first threshold value condition and a duration are stored in the conversion rule storing unit 51. In the example as illustrated in FIG. 22, in the conversion rule storing unit 51, a duration "150" is stored in correspondence with the phoneme string /t/ /o/ /o/ of the conversion rule 'toyo'< >/t/ /o/ /o/. Further, in the conversion rule storing unit 51, a duration "NONE" ("–" in FIG. 22) is stored in correspondence with a phoneme or a phoneme string other than /t/ /o/ /o/ of the conversion rule 'toyo'< >/t/ /o/ /o/. Namely, the duration is not set for a phoneme or a phoneme string other than /t/ /o/ /o/ of the conversion rule 'toyo'< >/t/ /o/ /o/. Here, the duration in the present embodiment is represented by ms (millisecond).

Similarly to the speech collating unit 17 as illustrated in FIG. 1, the speech collating unit 52 collates the feature amount converted by the speech analyzing unit 11 and the word model generated by the word model generating unit 16. As a result of the collation, the speech collating unit 52 calculates similarities at each time between the feature amount converted by the speech analyzing unit 11 and the word model generated by the word model generating unit 16. The speech collating unit 52 extracts, from the word models generated by the word model generating unit 16, a word model that satisfies all of the (1) to (3) that have been explained in the first embodiment. In the present embodiment, it is assumed that the speech collating unit 52 extracts the word model "tootomi" among the word models generated by the word model generating unit 16.

Figure 23:
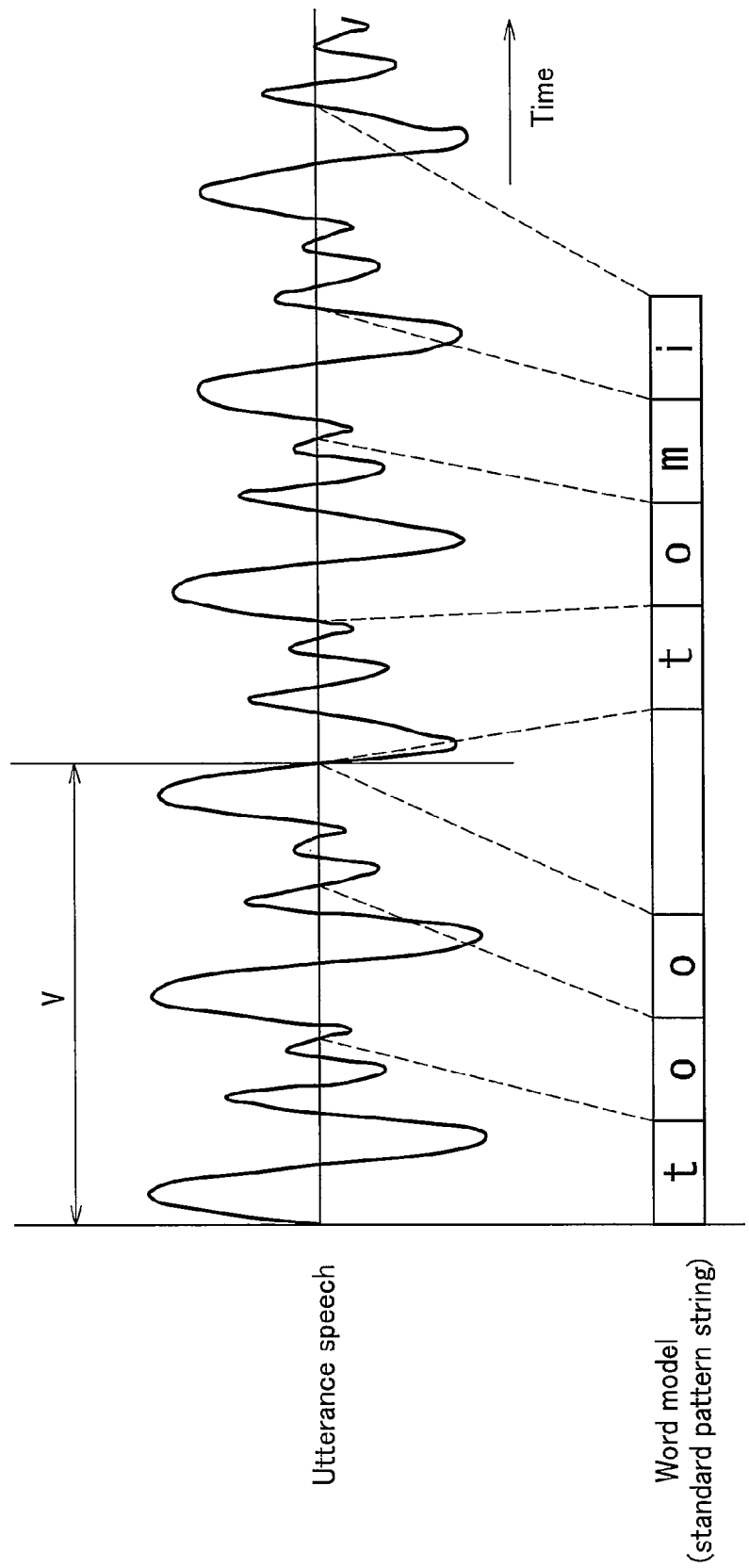
FIG. 23 is a diagram illustrating an example as a vocalization section V of an utterance speech corresponding to a standard pattern string of a phoneme string /t/ /o/ /o/.

The speech collating unit 52 determines whether the vocalization period in a section among vocalization sections and corresponding to either a phoneme or a phoneme string associated with the duration is at least equal to the duration or not. Specifically, the speech collating unit 52 first extracts a phoneme string /t/ /o/ /o/ associated with the duration "150". The speech collating unit 52 specifies a section corresponding to the extracted phoneme string /t/ /o/ /o/, from the vocalization sections of utterance speech. This section is specified by using a Viterbi algorithm for example. FIG. 23 is a diagram illustrating an example of a section V corresponding to the phoneme string /t/ /o/ /o/, among the vocalization sections of utterance speech. As illustrated in FIG. 23, the speech collating unit 52 specifies the section V corresponding to the phoneme string /t/ /o/ /o/, among the vocalization sections of utterance speech. The speech collating unit 52 calculates a vocalization period in the section V. Therefor, the speech collating unit 52 is provided with a time-counting function. In the present embodiment, it is assumed that the speech collating unit 52 calculates a vocalization period "160" (ms) in the section V.

In the present embodiment, the speech collating unit 52 determines that the vocalization period in the section V is equal to or longer than the duration. Namely, in the present invention, since the vocalization period in the section V is equal to or longer than the duration, the speech collating unit 52 determines that the user vocalizes slowly. That is, the speech collating unit 52 determines that the utterance speech does not become 'tootomi in a case where the user vocalizes the recognized word 'toyotomi, but that the user vocalizes intentionally a word 'tootomi other than the recognized word 'toyotomi . Therefore, the speech collating unit 52 rejects the extracted word model "tootomi".

Assuming that, when determining that the vocalization period in the section V is shorter than the duration, the speech collating unit 52 outputs as a recognition result the recognized word 'toyotomi corresponding to the extracted word model "tootomi". Namely, in a case where the vocalization period in the section V is shorter than the duration, the speech collating unit 52 determines that the user vocalizes fast. That is, the speech collating unit 52 determines that the utterance speech becomes 'tootomi in a case where the user vocalizes the recognized word 'toyotomi. Therefore, the speech collating unit 52 outputs the recognized word 'toyotomi corresponding to the extracted word model "tootomi".

Figure 24:
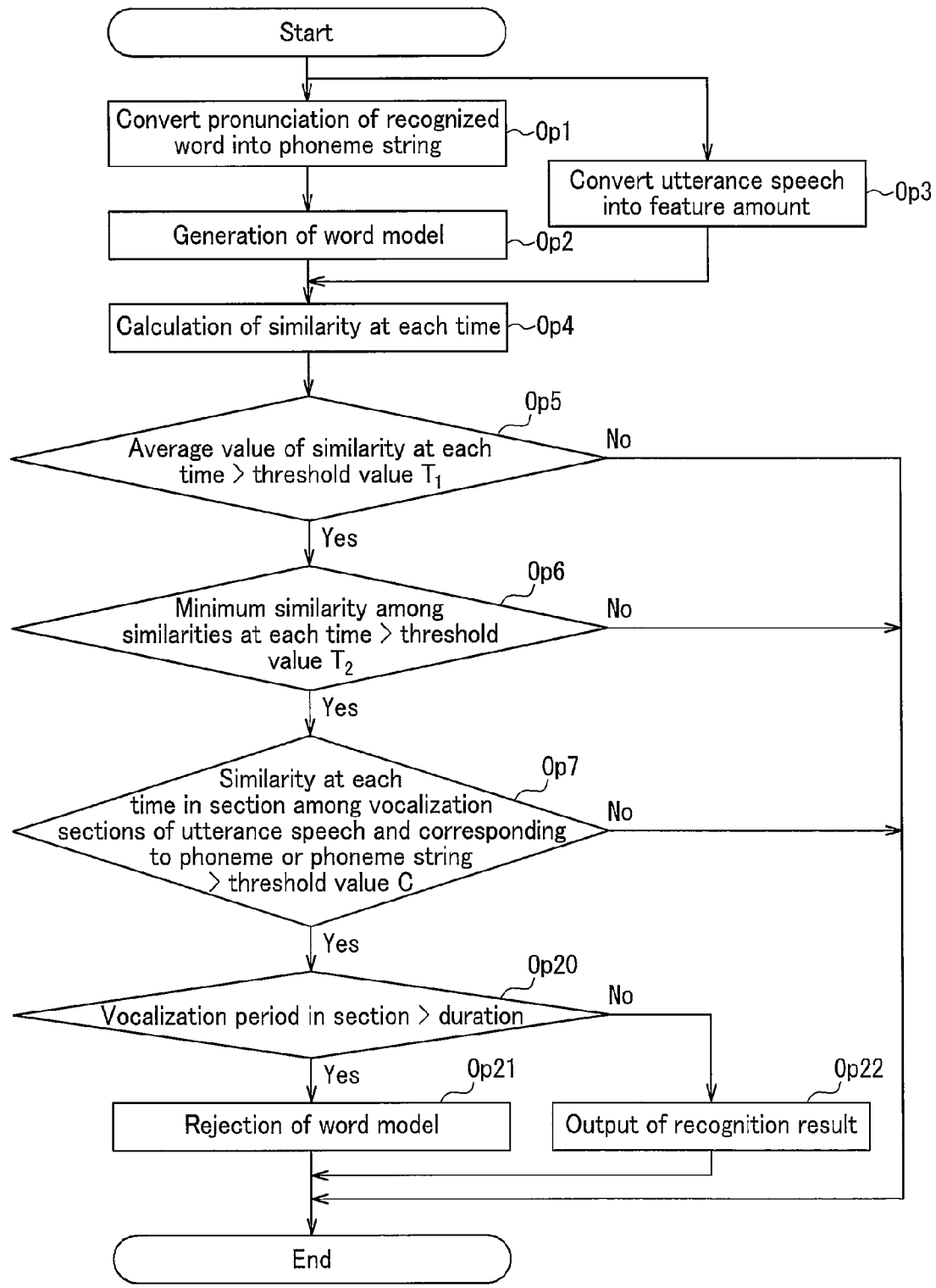
FIG. 24 is a flow chart illustrating an example of operations of the speech recognition apparatus.

Next, operations of the speech recognition apparatus 5 configured as described above will be described with reference to FIG. 24. In FIG. 24, components functioning as those in FIG. 8 are assigned with the identical reference signs in order to avoid duplicated explanation.

FIG. 24 is a flow chart illustrating an example of operations of the speech recognition apparatus 5. That is, in the step Op7, the speech collating unit 52 determines that a similarity at each time in a section among vocalization sections of utterance speech and corresponding to either a phoneme or a phoneme string associated with the first threshold value condition is equal to or longer than a threshold value C indicated by the first threshold value condition (YES in the step Op7), and subsequently determines whether the vocalization period in a section among vocalization sections of utterance speech and corresponding to either a phoneme or a phoneme string associated with the duration is at least equal to the duration or not (step Op20).

When determining that the vocalization period in a vocalization section among vocalization sections of utterance speech and corresponding to either a phoneme or a phoneme string associated with the duration is equal to or longer than the duration (YES in step Op20), the speech collating unit 52 rejects the word model generated in the step Op2 (step Op21). In contrast, when determining that the vocalization period in a section among vocalization sections of utterance speech and corresponding to either a phoneme or a phoneme string associated with the duration is shorter than the duration (NO in step Op20), the speech collating unit 52 outputs as a recognition result the recognized word corresponding to the word model generated in the step Op2 (step Op22).

As mentioned above, in the speech recognition apparatus 5 according to the present embodiment, when a vocalization period in a section among vocalization sections of utterance speech and corresponding to either a phoneme or a phoneme string associated with the duration is equal to or longer than the duration, a human being vocalizes slowly. Therefore, even when a word model is extracted, the speech collating unit 52 rejects the extracted word model. Thereby, a misrecognition by the speech recognition apparatus 5 can be prevented. On the other hand, when the vocalization period in a section among vocalization sections of utterance speech and corresponding to either a phoneme or a phoneme string associated with the duration is shorter than the duration, a human being vocalizes fast, and thus the speech collating unit 52 outputs the extracted word model as the recognition result. Thereby, the speech recognition apparatus 5 can recognize an utterance speech including an ambiguous phoneme in a case where a human being vocalizes a recognized word.

As mentioned above, the present invention is useful as a speech recognition apparatus that recognizes a human utterance speech, which is embodied by converting a pronunciation as a recognized word into a phoneme string in accordance with a conversion rule and by generating a word model as a standard pattern string on the basis of the converted phoneme string, and also as a speech recognition method or a speech recognition program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:
1. A speech recognition apparatus comprising:
a memory; and
a processor executing a plurality of instructions stored in the memory, the instructions comprising:

a speech analyzing instruction that converts an inputted utterance speech into a feature amount;

a recognized-word storing instruction that stores a pronunciation of a recognized word;

a conversion rule storing instruction that stores a conversion rule between a pronunciation and a phoneme or a conversion rule between a pronunciation and a phoneme string;

a phoneme string converting instruction that converts the pronunciation of the recognized word stored by the recognized-word storing instruction into a phoneme string in accordance with the conversion rule stored by the conversion rule storing instruction;

a phoneme model storing instruction that stores a standard pattern obtained by modeling information about which phoneme tends to become what kind of feature amount;

a word model generating instruction that generates a word model as a standard pattern string by extracting standard patterns stored by the phoneme model storing instruction on the basis of the phoneme string converted by the phoneme string converting instruction and by linking the extracted standard patterns; and a speech collating instruction that calculates similarities at each time between the feature amount converted by the speech analyzing instruction and the word model generated by the word model generating instruction, wherein:

the conversion rule storing instruction further stores a first threshold value condition associated with each of ambiguous phonemes or each of ambiguous phoneme strings of at least one of the conversion rules, which is ambiguous in a case where a human being vocalizes the recognized word, wherein different values are assigned to said first threshold value condition for different ambiguous phonemes and/or different ambiguous phoneme strings, and the speech collating instruction extracts a word model from the word models generated by the word model generating instruction, whose minimum similarity among the similarities at each time satisfies a second threshold value condition, and whose overall similarity obtained from similarities at each time satisfies a third threshold value condition, and whose similarity at each time in a section among vocalization sections of the utterance speech and corresponding to either one of the ambiguous phonemes or one of the phoneme strings, satisfies the first threshold value condition, which is stored by being associated with the one of the ambiguous phoneme or the one of the ambiguous phoneme strings, and outputs the recognized word as a recognition result corresponding to the extracted word model.

2. The speech recognition apparatus according to claim 1, wherein:

a plurality of the conversion rule storing instructions are provided for every condition indicated by the first threshold value condition, and the phoneme string converting instruction selects, from the plural conversion rule storing instructions, a conversion rule storing instruction to be used for converting the pronunciation of the recognized word into a phoneme string on the basis of a number of the pronunciations of the recognized word stored by the recognized-word storing instruction, and converts the pronunciation of the recognized word stored by the recognized-word storing instruction into a phoneme string in accordance with the conversion rule stored by the selected conversion rule storing instruction.

3. The speech recognition apparatus according to claim 1, further comprising:

a use-frequency calculating instruction that calculates a use-frequency of the conversion rule used for generating a word model corresponding to the recognized word as the recognition result outputted by the speech collating instruction; and a first threshold value condition updating instruction that, when a use-frequency of the conversion rule calculated by the use-frequency calculating instruction is higher than a boundary condition, updates a first threshold value condition associated with the phoneme or the phoneme string of the conversion rule so that the first threshold value condition is lowered, and when the use-frequency of the conversion rule calculated by the use-frequency calculating instruction is lower than the boundary condition, updates the first threshold value condition associated with the phoneme or the phoneme string of the conversion rule so that the first threshold value condition is raised.

4. The speech recognition apparatus according to claim 1, further comprising:

an inputting instruction that accepts a decision from a user whether the recognition result outputted by the speech collating instruction is incorrect or not;

a use-frequency calculating instruction that, when the inputting instruction accepts from the user a decision that the recognition result outputted by the speech collating instruction is incorrect, calculates a use-frequency of the conversion rule used for generating the word model corresponding to the recognized word as the recognition result; and a first threshold value condition updating instruction that, when a use-frequency of the conversion rule calculated by the use-frequency calculating instruction is higher than the boundary condition, updates a first threshold value condition associated with the phoneme or the phoneme string of the conversion rule so that the first threshold value condition is raised, and when the use-frequency of the conversion rule calculated by the use-frequency calculating instruction is lower than the boundary condition, updates the first threshold value condition associated with the phoneme or the phoneme string of the conversion rule so that the first threshold value condition is lowered.

5. The speech recognition apparatus according to claim 1, wherein:

the conversion rule storing instruction further stores a duration associated with the phoneme or the phoneme string of the conversion rule, and the speech collating instruction determines whether a vocalization period in a section among vocalization sections of the utterance speech and corresponding to either the phoneme or the phoneme string associated with the duration is at least equal to the duration or not; when determining that the vocalization period in the section is equal to or longer than the duration, the speech collating instruction rejects the extracted word model, and when determining that the vocalization period in the section is shorter than the duration, the speech collating instruction outputs as the recognition result the recognized word corresponding to the extracted word model.

6. A speech recognition method comprising:

a speech analysis in which a speech analyzing unit provided in a computer converts an inputted utterance speech into a feature amount;

a phoneme string conversion in which a phoneme string converting unit provided in the computer converts a pronunciation of a recognized word stored in a recognized-word storing unit that stores pronunciations of recognized words into a phoneme string, in accordance with a conversion rule stored in a conversion rule storing unit that stores either a conversion rule between a pronunciation and a phoneme or a conversion rule between a pronunciation and a phoneme string;

a word model generation in which a word model generating unit provided in the computer generates a word model as a standard pattern string, by extracting standard patterns stored in a phoneme model storing unit that stores standard patterns obtained by modeling information about which phoneme tends to become what kind of feature amount, on the basis of the phoneme string converted due to the phoneme string conversion, and by linking the extracted standard patterns; and a speech collation in which a speech collating unit provided in the computer calculates similarities at each time between the feature amount converted due to the speech analysis and the word model generated due to the word model generation, wherein:

the conversion rule storing unit further stores a first threshold value condition associated with each of ambiguous phonemes or each of ambiguous phoneme strings of at least one of the conversion rules, which is ambiguous in a case where a human being vocalizes the recognized word, wherein different values are assigned to said first threshold value condition for different ambiguous phonemes and/or different ambiguous phoneme strings, and the speech collating unit extracts a word model from the word models generated by the word model generating unit, whose minimum similarity among the similarities at each time satisfies a second threshold value condition, and whose overall similarity obtained from similarities at each time satisfies a third threshold value condition, and whose similarity at each time in a section among vocalization sections of the utterance speech and corresponding to either one of the ambiguous phonemes or one of the phoneme strings, satisfies the first threshold value condition, which is stored by being associated with the one of the ambiguous phoneme or the one of the ambiguous phoneme strings, and outputs the recognized word as a recognition result corresponding to the extracted word model.

7. A non-transitory recording medium storing a speech recognition program that causes a computer to execute:

a speech analysis of converting an inputted utterance speech into a feature amount, by the computer;

a phoneme string conversion of converting a pronunciation of a recognized word stored in a recognized-word storing unit that stores recognized words into a phoneme string in accordance with a conversion rule stored in a conversion rule storing unit that stores either a conversion rule between a pronunciation and a phoneme or a conversion rule between a pronunciation and a phoneme string, by the computer;

a word model generation of generating a word model as a standard pattern string, by extracting a standard pattern stored in a phoneme model storing unit that stores standard patterns obtained by modeling information about which phoneme tends to become what kind of feature amount, on the basis of the phoneme string converted due to the phoneme string conversion, and by linking the extracted standard patterns, by the computer; and a speech collation of calculating similarities at each time between the feature amount converted due to the speech analysis and the word model generated due to the word model generation, by the computer, wherein:

the conversion rule storing unit further stores a first threshold value condition associated with each of ambiguous phonemes or each of ambiguous phoneme strings of at least one of the conversion rules, which is ambiguous in a case where a human being vocalizes the recognized word, wherein different values are assigned to said first threshold value condition for different ambiguous phonemes and/or different ambiguous phoneme strings, and in the speech collation, the computer is caused to execute: extracting a word model from the word models generated due to the word model generation, whose minimum similarity among the similarities at each time satisfies a second threshold value condition, and whose overall similarity obtained from similarities at each time satisfies a third threshold value condition, and whose similarity at each time in a section among vocalization sections of the utterance speech and corresponding to either one or the ambiguous phonemes or one of the phoneme strings, satisfies the first threshold value condition, which is stored by being associated with the one of the ambiguous phoneme or the one of the ambiguous phoneme strings; and outputting as a recognition result the recognized word corresponding to the extracted word model.

* * * * *